(12) United States Patent
Das et al.

(10) Patent No.: US 12,462,431 B1
(45) Date of Patent: Nov. 4, 2025

(54) SYSTEM AND METHOD FOR AUTOMATED CALIBRATION FOR A SCANNING SYSTEM

(71) Applicant: Pramana, Inc., Cambridge, MA (US)

(72) Inventors: Dipankar Das, Bangalore (IN);
Raghubansh Bahadur Gupta, Bangalore (IN); Ajay Chadha, Bangalore (IN); Bhaskar B N Shetty, Bangaluru (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/210,331

(22) Filed: May 16, 2025

(51) Int. Cl.
*G06T 7/00* (2017.01)
*G06T 7/80* (2017.01)

(52) U.S. Cl.
CPC .............. *G06T 7/80* (2017.01); *G06T 7/0002* (2013.01); *G06T 2207/10056* (2013.01); *G06T 2207/30168* (2013.01)

(58) Field of Classification Search
CPC .......... G06T 7/00; G06T 7/08; G06T 7/0002; G06T 2207/10056; G06T 2207/30168
USPC .................................................... 348/79, 189
See application file for complete search history.

(56) References Cited

U.S. PATENT DOCUMENTS

| | | | |
|---|---|---|---|
| 9,986,224 B2 * | 5/2018 | Mullis | H04N 23/667 |
| 10,192,305 B2 * | 1/2019 | Julkunen | G06T 7/0004 |
| 10,762,630 B2 * | 9/2020 | Yaqub | G06T 7/0014 |
| 2011/0249910 A1 * | 10/2011 | Henderson | G06V 10/993 |
| | | | 382/278 |
| 2012/0050488 A1 | 3/2012 | Cohen et al. | |
| 2014/0294266 A1 * | 10/2014 | Eichhorn | H04N 19/86 |
| | | | 382/128 |
| 2020/0355903 A1 * | 11/2020 | Bredno | H04N 23/67 |
| 2021/0201536 A1 * | 7/2021 | Atchison | G06T 7/90 |
| 2024/0386560 A1 | 11/2024 | Dodle et al. | |
| 2025/0123555 A1 * | 4/2025 | Syu | G03F 1/84 |

FOREIGN PATENT DOCUMENTS

| EP | 1368782 A1 | 12/2003 |
|---|---|---|
| JP | 2011108250 A | 6/2022 |

* cited by examiner

*Primary Examiner* — Trang U Tran
(74) *Attorney, Agent, or Firm* — Caldwell Intellectual Property Law

(57) ABSTRACT

An automated resolution and sharpness calibration system for target scanning includes an imaging reference located on a scanner's scanning stage and an optical sensor configured to capture reference images before and after scanning a target. The system comprises a processor and a memory with instructions that enable the processor to receive the captured reference images, determine image metrics based on reference features, and detect deviations in these metrics between the images. The processor classifies the detected deviation to identify its cause and generates an alert signal accordingly. This system ensures precise calibration by analyzing deviations in image metrics, thereby maintaining optimal scanning performance and accuracy.

24 Claims, 12 Drawing Sheets

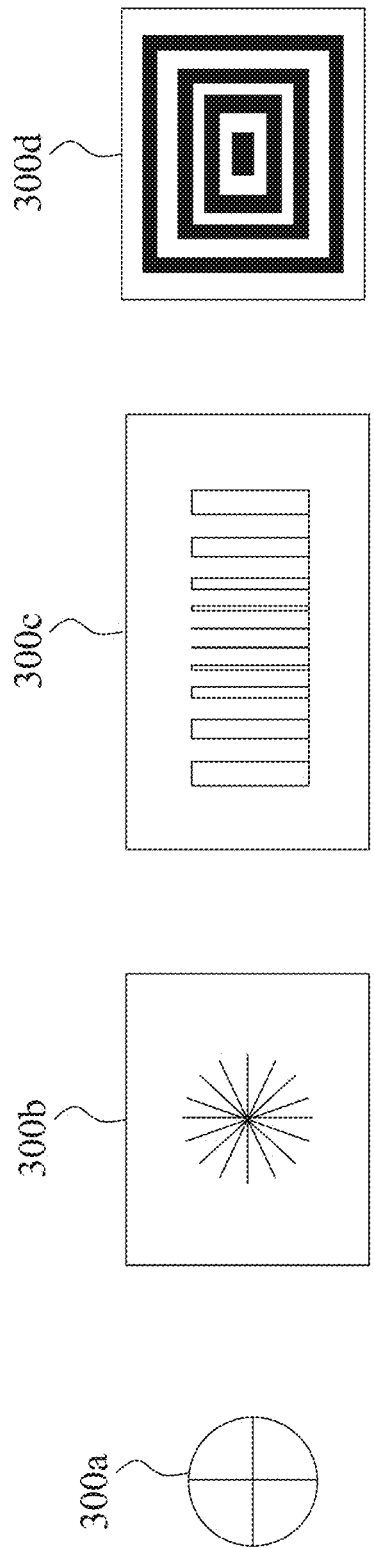

SYSTEM AND METHOD FOR AUTOMATED CALIBRATION FOR A SCANNING SYSTEM

FIELD OF THE INVENTION

The present invention generally relates to the field of scanning systems. In particular, the present invention is directed to a system and method for automated calibration for a scanning system.

BACKGROUND

In the field of target scanning systems, ensuring optimal resolution and sharpness is critical for accurate image analysis and diagnostics. Traditional methods for calibrating resolution and sharpness often involve manual adjustments and periodic maintenance checks, which can be time-consuming and prone to human error. These methods typically require skilled technicians to visually inspect scanned images and make necessary adjustments to the scanner's optical components, such as lenses and sensors, to maintain image quality. This manual process can lead to inconsistencies in image quality and increased downtime for the scanning system. However, none of these approaches have provided a comprehensive solution that combines the features described in this disclosure.

SUMMARY OF THE DISCLOSURE

In some aspects, the techniques described herein relate to a system for automated calibration for a scanning system, the system including an imaging reference located on a scanning stage of a scanner, an optical sensor, wherein the optical sensor is configured to capture a first reference image of the imaging reference prior to scanning a target, and capture a second reference image of the imaging reference after scanning the target, at least a processor, and a memory communicatively connected to the at least a processor, wherein the memory contains instructions configuring the at least a processor to receive the first reference image and the second reference image from the optical sensor, determine one or more image metrics of each of the first reference image and the second reference image as a function of reference features of the imaging references in the first reference image and the second reference image, detect a reference deviation in the one or more image metrics between the first reference image and the second reference image, classify the reference deviation to a deviation cause of the reference deviation, and generate an alert signal as a function of the deviation cause, wherein the alert signal is configured to initiate an automated calibration process.

In some aspects, the techniques described herein relate to a method for automated calibration for a scanning system, the method including capturing, using an optical sensor, a first reference image of an imaging reference prior to scanning a target, wherein the imaging reference located on a scanning stage of a scanner, capturing, using the optical sensor, a second reference image of the imaging reference after scanning the target, receiving, using at least a processor, the first reference image and the second reference image from the optical sensor, determining, using the at least a processor, one or more image metrics of each of the first reference image and the second reference image as a function of reference features of the imaging references in the first reference image and the second reference image, detecting, using the at least a processor, a reference deviation in the one or more image metrics between the first reference image and the second reference image, classifying, using the at least a processor, the reference deviation to a deviation cause of the reference deviation, and generating, using the at least a processor, an alert signal as a function of the deviation cause, wherein the alert signal is configured to initiate an automated calibration process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 illustrates configurations of exemplary imaging references;

Figure 1:
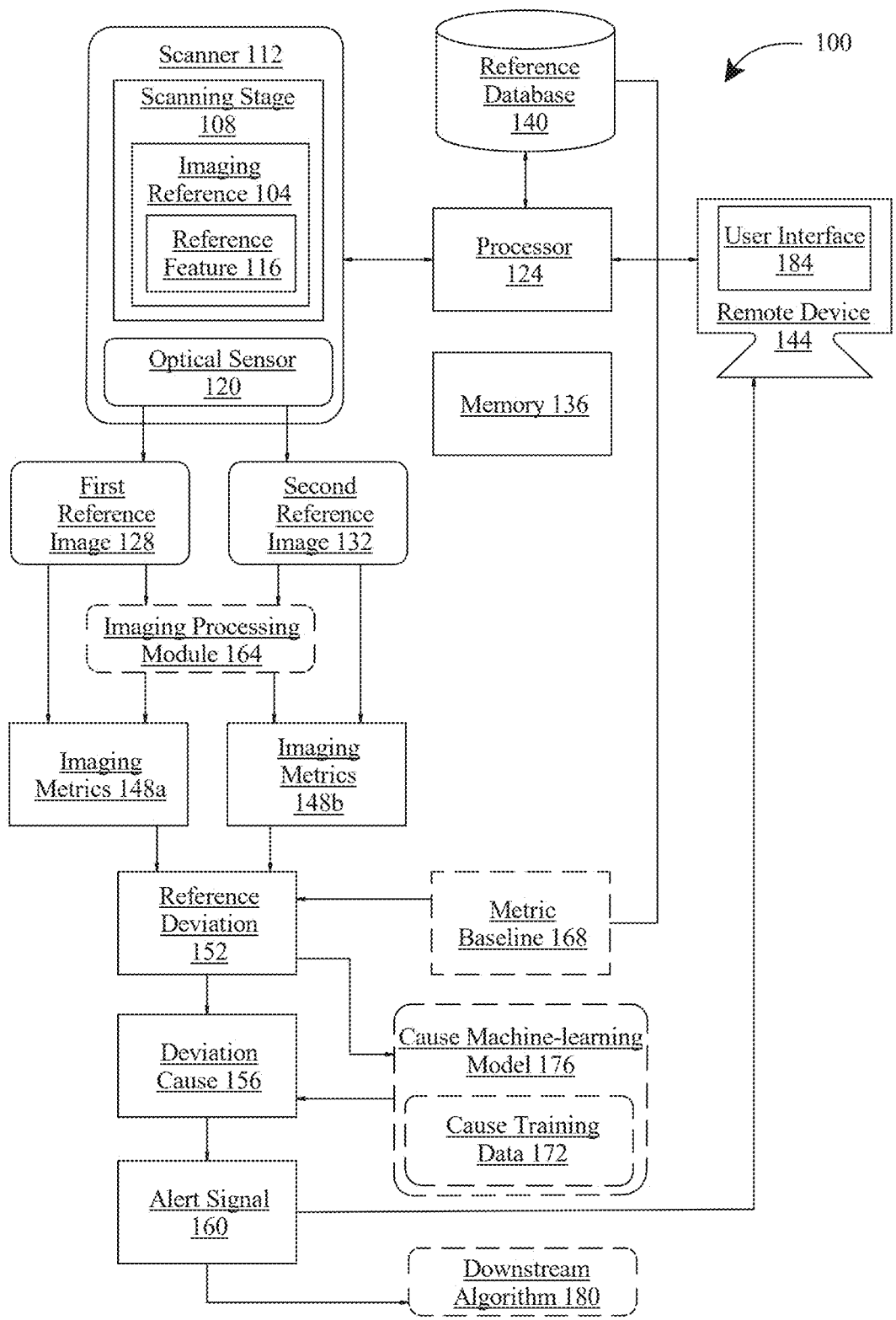
FIG. 1 illustrates a block diagram of an exemplary system for automated calibration for a scanning system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated calibration for a scanning system are disclosed. The system including an imaging reference located on a scanning stage of a scanner, an optical sensor, wherein the optical sensor is configured to capture a first reference image of the imaging reference prior to scanning a target, and capture a second reference image of the imaging reference after scanning the target, at least a processor, and a memory communicatively connected to the at least a processor, wherein the memory contains instructions configuring the at least a processor to receive the first reference image and the second reference image from the optical sensor, determine one or more image metrics of each of the first reference image and the second reference image as a function of reference features of the imaging references in the first reference image and the second reference image, detect a reference deviation in the one or more image metrics between the first reference image and the second reference image, classify the reference deviation to a deviation cause of the reference deviation, and generate an alert signal as a function of the deviation cause. Exemplary embodiments illustrating aspects of the present disclosure are described below in the context of several specific examples, wherein the alert signal is configured to initiate an automated calibration process.

Automated calibration systems have been developed to address some of the limitations of manual calibration. These systems often utilize test patterns or calibration targets that are scanned periodically to assess the performance of the scanner. The scanned images of these test patterns are analyzed to determine if the scanner is operating within acceptable parameters. However, these systems may still require manual intervention to interpret the results and make necessary adjustments, limiting their effectiveness in providing real-time calibration during routine scanning operations.

Recent advancements have introduced more sophisticated automated calibration techniques that incorporate machine learning algorithms and advanced image processing methods. These systems aim to provide continuous monitoring and adjustment of scanner settings by analyzing image quality metrics such as contrast, sharpness, and resolution. Despite these advancements, challenges remain in accurately identifying and classifying deviations in image quality, as well as in providing timely alerts to operators for corrective actions.

The disclosed invention is particularly well-suited for applications in cytology, where image quality, sharpness, and resolution fidelity are paramount to accurate diagnosis. Cytology involves the microscopic examination of individual cells or small clusters of cells to detect morphological abnormalities, infections, or malignancies. Diagnostic accuracy in cytology is highly dependent on the ability of the imaging system to resolve fine nuclear details, cytoplasmic boundaries, and chromatin patterns at high magnification.

Traditional digital pathology scanners generally lack an in-line verification mechanism to assess image quality between slide scans. As a result, quality control is often reactive, relying on retrospective review or intermittent calibration using external slides, which interrupts workflow and fails to catch transient or progressive degradations in imaging performance. These limitations are especially problematic in cytology, where visualizing small, isolated features requires consistent optical precision throughout each scan cycle.

The disclosed system, in embodiments, enables continuous in-line calibration, reducing reliance on external calibration slides and allowing for automated detection of image quality issues. By comparing the metrics across scanning cycles, the system detects deviations indicative of optical, mechanical, or hardware-related errors in real time. This in-line calibration process occurs automatically as part of the normal scanning routine, eliminating the need for separate calibration procedures and ensuring consistent image quality throughout high-throughput operations.

Referring now to FIG. 1, an exemplary embodiment of an system 100 for automated calibration for a scanning system is illustrated. System 100 includes an imaging reference 104 located on a scanning stage 108 of a scanner 112. For the purposes of this disclosure, an "imaging reference" is a physical calibration feature located on, affixed to, or located on a scanning stage of a scanner. In some embodiments, imaging reference 104 may include a pattern or structure with known geometric or optical characteristics that is configured to be captured by an optical sensor. In some embodiments, imaging reference 104 may include, without limitation, resolution targets, crosshair patterns, grid structures, multispectral calibration target, high-contrast geometric reference pattern or other standard calibration marks formed on a transparent or semi-transparent substrate. For the purposes of this disclosure, a "resolution target" is a physical pattern or structure composed of known optical features that are used to evaluate a resolution of an image. In some embodiments, resolution target may include one or more geometrically precise features such as bar patterns, line pairs, dot arrays, grids, or concentric circles formed with calibrated dimensions to evaluate resolution of images. As another non-limiting example, imaging reference 104 may include calibration target, distortion target, slant edge target, reticle, aperture obstruction target, annular aperture obstruction target, fluorescent target and disk, and the like. In some embodiments, imaging reference 104 may be positioned adjacent to a target position of scanning stage 108 to enable in-line calibration before and after a slide is scanned, without requiring removal or replacement of targets. For the purposes of this disclosure, a "target position" is a designated area on a scanning stage that is configured to receive, hold, and align a target for imaging during a scanning operation. In some embodiments, target position may include one or more alignment features configured to maintain a target in a stable and known orientation relative to scanner optics. As a non-limiting example, alignment feature may include recessed contours, clamps, clips, or edge guides. In some embodiments, target position may define an imaging field in which a sample mounted on target is optically captured by scanner 112. In some embodiments, imaging reference 104 may be embedded adjacent to target position of scanning stage 108. In one non-limiting example, imaging reference 104 may be formed or affixed directly onto the surface of scanning stage 108 in a peripheral region immediately beside target position. In some embodiments, imaging reference 104 may be embedded over target position.

With continued reference to FIG. 1, in some embodiments, imaging reference 104 may include a reference feature 116. For the purposes of this disclosure, "reference feature" refers to a visually distinguishable element of an imaging reference that possesses known geometric, spatial, or optical characteristics. In some embodiments, reference feature 116 may include, but is not limited to, resolution bars, line pairs, dot arrays, crosshairs, grid structures, concentric circles, or other high-contrast calibration marks fabricated with defined dimensions and tolerances. In some embodiments, reference features 116 may be formed on a transparent or semi-transparent substrate and positioned within imaging reference 104 in a fixed, repeatable orientation relative to target position on scanning stage 108.

With continued reference to FIG. 1, for the purposes of this disclosure, a "scanner" is a device configured to capture digital representations of physical targets, specimens, or substrates placed on or within the scanner's imaging field. In some embodiments, scanner 112 may include mechanical components for receiving, positioning, and translating targets into an imaging region, as well as optical components such as lenses, illumination systems, and optical sensors 120 to acquire two-dimensional or three-dimensional reference images. As a non-limiting example, scanner 112 may include a motorized stage (scanning stage 108) for precision target movement, a camera array for capturing tiled image segments, and a control interface for automated or semiautomated scanning operations. In some embodiments, scanner 112 may be configured to operate as part of a robotic system for high-throughput target digitization in pathology, biological imaging, or industrial inspection environments. For the purposes of this disclosure, a "target" is any physical object, structure, or surface that is positioned within the optical path of a scanning system for the purpose of being imaged, analyzed, or evaluated. In some embodiments, target may include a slide. For the purposes of this disclosure, a "slide" is a thin, flat substrate upon which a sample or object of interest is mounted for optical examination. In some embodiments, slide may include cytology and/or microbiology slide. For the purposes of this disclosure, a "cytology slide" is a microscope slide that contains a prepared sample of individual cells or cellular material stained for the purpose of microscopic examination and diagnostic evaluation. For the purposes of this disclosure, a "microbiology slide" is a microscope slide that contains a microbial specimen. In some embodiments, scanner 112 may be operatively coupled to one or more sensors.

With continued reference to FIG. 1, in some cases, scanners 112 may include devices or systems used to digitize targets containing biomedical specimens (e.g., tissue samples). As a non-limiting example, scanners 112 may include digital cameras, digital microscopes, digital pathology scanners, or the like. During scanning operation of scanners 112, scanners 112 may capture digital images (e.g., reference images) of imaging reference 104 and send them to processor 124 using network. For efficient storage and/or transmission, images may be compressed prior to or during transmission. Security measures such as encryption, authentication (including multi-factor authentication), SSL, HTTPS, and other security techniques may also be applied. In some embodiments, processor 124 and/or remote device may be configured to control the operation of scanners 112 to automate the target digitization process. For example, and without limitation, processor 124 may send instructions to scanners 112 to scan or rescan selected portions of a target. Additional disclosure related to scanners and target digitization process may be found in U.S. patent application Ser. No. 18/602,947, filed on Mar. 12, 2024, entitled "SYSTEMS AND METHODS FOR INLINE QUALITY CONTROL OF TARGET DIGITIZATION," which is incorporated herein by reference in its entirety.

With continued reference to FIG. 1, in some embodiments, system 100 may include one scanner 112 or a cluster of scanners 112. For the purposes of this disclosure, a "cluster" is a group of various components that is gathered to perform a specific task collaboratively. In a non-limiting example, cluster may be configured to scan a target and generate an image of the microscope target. In some cases, cluster may include a plurality of clusters. As a non-limiting example, processor 124 may be configured to receive reference images from each optical sensor 120 of scanners 112 in five clusters or any numbers of clusters.

With continued reference to FIG. 1, in an embodiment, scanner 112 may include at least a scanning stage 108 configured to receive and hold target. As used in this disclosure, a "scanning stage" is a flat platform (i.e., an even surface without significant bumps, depressions, or curvatures) on which target or specimen is placed for examination. In some cases, scanning stage 108 may include a target port having one or more alignment features, wherein the "alignment features" are physical features that help to secure received target in place and/or align a target with another component of scanner as described herein. In some embodiments, alignment features may include a component which keeps target secure, such as a clamp, latch, clip, recessed area, or another fastener. In some embodiments, scanning stage 108 may allow for easy removal or insertion of target. In some embodiments, scanning stage 108 may include a transparent surface through which light may travel. In some embodiments, target may rest on and/or may be illuminated by light traveling through such a transparent surface of scanning stage 108.

With continued reference to FIG. 1, system 100 includes an optical sensor 120. For the purposes of this disclosure, an "optical sensor" is a device that detects light or other electromagnetic radiation within or near the visible, ultraviolet, or infrared spectrum. As a non-limiting example, optical sensor 120 may include camera. As a non-limiting example, optical sensor 120 may include charge-coupled devices (CCD), complementary metal-oxide-semiconductor (CMOS) sensors, photodiodes, phototransistors, light-dependent resistors (LDR), position-sensitive detectors, multispectral or hyperspectral imaging sensors, or a combination thereof. The optical sensor 120 may be configured to capture still images, video sequences, or discrete optical measurements from one or more fields of view. In some embodiments, optical sensor 120 may operate alone or in combination with additional sensors to detect characteristics such as object position, orientation, surface texture, or alignment of physical components. The optical data or reference images generated may be transmitted via wired or wireless communication to a processing system for further analysis, such as deviation detection, calibration, or correction operations.

With continued reference to FIG. 1, for the purposes of this disclosure, a "sensor" is a device that produces an output signal for the purpose of sensing a physical phenomenon. For example, and without limitation, sensor may transduce a detected phenomenon, such as without limitation, temperature, voltage, current, pressure, speed, motion, light, moisture, and the like, into a sensed signal. Sensor may output the sensed signal. Sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by sensor may include circuitry, computing devices, electronic components or a combination thereof that translates into at least an electronic signal configured to be transmitted to another electronic component.

With continued reference to FIG. 1, optical sensor 120 is configured to capture a first reference image 128 of imaging reference 104 prior to scanning a target and capture a second reference image 132 of the imaging reference 104 after scanning the target. For the purposes of this disclosure, a "first reference image" is an image of an imaging reference acquired by an optical sensor prior to the scanning of a target. For the purposes of this disclosure, a "second reference image" is an image of an imaging reference captured by an optical sensor after the scanning of a target. In a non-limiting example, first reference image 128, captured prior to scanning a target, may provide a pre-scan benchmark of the system's imaging fidelity, while second reference image 132, captured after the scanning operation, may provide a post-scan comparison point.

With continued reference to FIG. 1, system 100 includes at least a processor 124. Processor 124 may include, without limitation, any processor described in this disclosure. Processor 124 may be included in a computing device. Processor 124 may include any computing device as described in this disclosure, including without limitation a microcontroller, microprocessor, digital signal processor (DSP) and/or system on a chip (SoC) as described in this disclosure. Processor 124 may include, be included in, and/or communicate with a mobile device such as a mobile telephone or smartphone. Processor 124 may include a single computing device operating independently, or may include two or more computing device operating in concert, in parallel, sequentially or the like; two or more computing devices may be included together in a single computing device or in two or more computing devices. Processor 124 may interface or communicate with one or more additional devices as described below in further detail via a network interface device. Network interface device may be utilized for connecting processor 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 124 may include but is not limited to, for example, a computing device or cluster of computing devices in a first location and a second computing device or cluster of computing devices in a second location. Processor 124 may include one or more computing devices dedicated to data storage, security, distribution of traffic for load balancing, and the like. Processor 124 may distribute one or more computing tasks as described below across a plurality of computing devices of computing device, which may operate in parallel, in series, redundantly, or in any other manner used for distribution of tasks or memory between computing devices. Processor 124 may be implemented, as a non-limiting example, using a "shared nothing" architecture.

With continued reference to FIG. 1, processor 124 may be designed and/or configured to perform any method, method step, or sequence of method steps in any embodiment described in this disclosure, in any order and with any degree of repetition. For instance, processor 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a memory 136 communicatively connected to processor 124. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 136 contains instructions configuring processor 124 to receive first reference image 128 and second reference image 132 from optical sensor 120. In some embodiments, processor 124 may receive first reference image 128 and second reference image 132 from a reference database 140. In some embodiments, processor 124 may receive first reference image 128 and second reference image 132 from a remote device 144.

With continued reference to FIG. 1, in some embodiments, system 100 may include a reference database 140. As used in this disclosure, "scan database" is a data structure configured to store data associated with reference images. As a non-limiting example, reference database 140 may store first reference image 128, second reference image 132, image metrics 148*a-b*, reference deviation 152, deviation cause 156, alert signal 160, and the like. In one or more embodiments, reference database 140 may include inputted or calculated information and datum related to a reference images. In some embodiments, a datum history may be stored in reference database 140. As a non-limiting example, the datum history may include real-time and/or previous inputted data related to reference images. As a non-limiting example, reference database 140 may include instructions from a user, who may be an expert user, a past user in embodiments disclosed herein, or the like, where the instructions may include examples of the data related to reference images.

With continued reference to FIG. 1, in some embodiments, processor 124 may be communicatively connected with reference database 140. For example, and without limitation, in some cases, reference database 140 may be local to processor 124. In another example, and without limitation, reference database 140 may be remote to processor 124 and communicative with processor 124 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 124 connect directly, dynamically, and non-hierarchically to as many other computing devices as possible. A "network topology" as used in this disclosure is an arrangement of elements of a communication network. The network may use an immutable sequential listing to securely store reference database 140. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, reference database 140 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, may be aware of various ways in which data entries in a database may store, retrieve, organize, and/or reflect data and/or records as used herein, as well as categories and/or populations of data consistently with this disclosure.

With continued reference to FIG. 1, in some embodiments, processor 124 may receive first reference image 128 and second reference image 132 from a remote device 144. For the purposes of this disclosure, a "remote device" is an external device to processor 124. Exemplary remote device 144 may include a computing device, processor, external device, and the like thereof. In some cases, remote device 144 may be communicatively connected to scanner 112. As a non-limiting example, scanners 112 or imaging devices may be communicatively coupled to processor 124 and/or remote device 144 using a network. As a non-limiting example, network may include one or more local area networks (LANs), wide area networks (WANs), wired networks, wireless networks, the Internet, or any network described in this disclosure. In a non-limiting example, scanners 112 may communicate with processor 124 over network using the TCP/IP protocol or other suitable networking protocols. As a non-limiting example, remote device 144 may include a laptop, desktop, tablet, mobile phone, smart phone, smart watch, kiosk, screen, smart headset, or things of the like. In some embodiments, remote device 144 may include an interface configured to receive inputs from a user. In some embodiments, user may manually input any data into system 100 using remote device 144. In some embodiments, user may have a capability to process, store or transmit any information independently.

With continued reference to FIG. 1, memory 136 contains instructions configuring processor 124 to determine one or more image metrics 148a-b of each of first reference image 128 and second reference image 132 as a function of reference features 116 of imaging references 104 in first reference image 128 and second reference image 132. For the purposes of this disclosure, "imaging metrics" are quantifiable values derived from analyzing features in imaging references. As a non-limiting example, image metrics 148a-b may include sharpness values, resolution scores, edge clarity indicators, alignment measurements, contrast ratios, and geometric integrity assessments. In some embodiments, imaging metrics 148a-b may include sharpness metrics. For the purposes of this disclosure, "sharpness metrics" refer to quantifiable values that characterize the degree of visual clarity, edge definition, or spatial frequency detail in an image. As a non-limiting example, a high sharpness metric may be indicated by narrow edge transitions and strong intensity gradients in the reference features 116. As another non-limiting example, a lower sharpness metric may reflect blurring, diffusion, or softness, suggesting defocus or optical contamination. In some embodiments, imaging metrics 148a-b may include visibility metrics. For the purposes of this disclosure, "visibility metrics" refer to quantifiable measurements that characterize the degree to which reference features within an image are distinguishable from their background or surrounding structures. As a non-limiting example, visibility metrics may include a modulation contrast between adjacent bars in a resolution target, or a normalized brightness difference between a reference dot and its background region. In a non-limiting example, decrease in visibility metrics may indicate optical issues such as defocus, contamination, sensor degradation, or illumination irregularities. In some embodiments, processor 124 may determine image metrics 148a-b using digital image processing techniques as described in detail below applied to reference features 116 of resolution target or other imaging reference 104. In a non-limiting example, reference features 116 may include high-precision line pairs, bar patterns, dot grids, concentric circles, or other structures with known spatial and optical properties that serve as baseline references for evaluating image quality of first reference image 128 and/or second reference image 132. In some embodiments, processor 124 may extract and evaluate same reference features 116 from both first reference image 128 and second reference image 132 to determine whether any significant deviation (reference deviation 152) in image metrics 148a-b of the first reference image 128 and the second reference image 132 has occurred. For example, and without limitation, image metrics 148a-b may include a pre-scan sharpness score of 0.95 for first reference image 128 and a post-scan score of 0.78 for second reference image 132.

With continued reference to FIG. 1, in some embodiments, one or more image metrics 148a-b may be associated with one or more of sharpness, resolution, and alignment. For the purposes of this disclosure, "sharpness" refers to clarity or edge definition of reference features in a reference image. In some embodiments, sharpness may be measured using gradients, contrast transitions, or frequency-based techniques to determine the degree of focus. For the purposes of this disclosure, "resolution" refers to a system's ability to distinguish fine structural details in an image. In some embodiments, resolution may be evaluated by identifying the smallest line pairs or features within resolution target that remain distinguishable under current imaging conditions. For the purposes of this disclosure, "alignment" refers to geometric consistency and positional accuracy of an imaging system. In some embodiments, alignment may be assessed by detecting lateral shifts, rotational offsets, or distortions in the placement or shape of reference features 116. As a non-limiting example, image metrics 148*a-b* may include a sharpness score derived from edge clarity analysis, a resolution threshold based on visible line spacing, and an alignment error value calculated from spatial displacement of grid patterns.

With continued reference to FIG. 1, in some embodiments, first reference image 128 and/or second reference image 132 may be analyzed using an image processing module 164 to extract reference features 116 and determine image metrics 148*a-b*. As used in this disclosure, an "image processing module" is one or more distinct image processing technique designed to perform specific processing tasks and or operations to a digital image. For example, and without limitation, image processing module 164 may be configured to compile plurality of digital images to create an integrated image. In an embodiment, image processing module 164 may include a plurality of software algorithms that can analyze, manipulate, or otherwise enhance an image, such as, without limitation, a plurality of image processing techniques as described below. Image processing module 164 may include, without limitation, modules that perform modifications such as random rotation, color jitter, Gaussian blur, perspective transform, shear transform, shadow casting, reflected light, ink color swap, moire, noise texturization, Gaussian noise, salt and pepper noise, folding and creasing, crumpled paper effect, and the like, and described in detail above. In a non-limiting example, image processing module 164 may include any combination of image processing module 164. In some cases, image processing module 164 may be implemented with one or more image processing libraries such as, without limitation, OpenCV, PIL/Pillow, ImageMagick, and the like. Image processing module 164 may include, be included in, or be communicatively connected to processor 124, and/or memory 136.

With continued reference to FIG. 1, in an embodiment, image processing module 164 may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing modules 164 may be configured to perform a lossless compression on images, wherein the lossless compression may maintain the original image quality of images. In a nonlimiting example, image processing module 164 may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module 164 may be configured to perform a lossy compression on plurality of images, wherein the lossy compression may sacrifice some image quality of images to achieve higher compression ratios. In a non-limiting example, image processing module 164 may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

With continued reference to FIG. 1, in an embodiment, processing images may include determining a degree of quality of depiction (image metrics 148*a-b*) of a region of interest (reference feature 116) of an image or a plurality of images (first reference image 128 and second reference image 132). In an embodiment, image processing module 164 may determine a degree of blurriness of images. In a non-limiting example, image processing module 164 may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module 164 may be configured to rank images according to degree of quality of depiction of a region of interest and select a highest-ranking image from a plurality of digital images.

With continued reference to FIG. 1, processing images may include enhancing at least a region of interest via a plurality of image processing techniques to improve the quality (or degree of quality of depiction) of an image for better processing and analysis as described further in this disclosure. In an embodiment, image processing module 164 may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module 164, by averaging or filtering out pixel values in neighborhood of each pixel of an image to reduce random variations.

With continued reference to FIG. 1, in another embodiment, image processing module 164 may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,977,215 in a 24-bit color image. In some cases, contrast enhancement operation may include, without limitation, histogram equalization, adaptive histogram equalization (CLAHE), contrast stretching, and/or the like. Image processing module 164 may be configured to adjust the brightness and darkness levels within an image to make a feature more distinguishable (i.e., increase degree of quality of depiction). Additionally, or alternatively, image processing module 164 may be configured to perform a brightness normalization operation to correct variations in lighting conditions (i.e., uneven brightness levels). In some cases, an image may include a consistent brightness level across a region after brightness normalization operation performed by image processing module 164. In a non-limiting example, image processing module 164 may perform a global or local mean normalization, where the average intensity value of an entire image or region of an image may be calculated and used to adjust the brightness levels.

With continued reference to FIG. 1, in other embodiments, image processing module 164 may be configured to perform a color space conversion operation to increase degree of quality of depiction. In a non-limiting example, in case of a color image (i.e., RGB image), image processing module 164 may be configured to convert RGB image to grayscale or HSV color space. Such conversion may emphasize the differences in intensity values between a region or feature of interest and the background. Image processing module 164 may further be configured to perform an image sharpening operation such as, without limitation, unsharp masking, Laplacian sharpening, high-pass filtering, and/or the like. Image processing module 164 may use image sharpening operation to enhance the edges and fine details related to a region or feature of interest within an image by emphasizing high-frequency components within an image.

With continued reference to FIG. 1, processing images may include isolating a region or feature of interest from the rest of an image as a function of plurality of image processing techniques. Images may include highest-ranking image selected by image processing module 164 as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structuring element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module 164 to enhance the edges of objects, remove noise, or fill gaps in a region or feature of interest before further processing.

With continued reference to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module 164, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

With continued reference to FIG. 1, in a non-limiting example, identifying one or more reference features 116 from first reference image 128 and/or second reference image 132 may include isolating one or more areas of interests (reference features 116) using one or more edge detection techniques. An area of interest may include a specific area within a digital image that contains information relevant to further processing, such as one or more image features. In a non-limiting example, image data located outside an area of interest may include irrelevant or extraneous information. Such portion of first reference image 128 and/or second reference image 132 containing irrelevant or extraneous information may be disregarded by image processing module 164, thereby allowing resources to be concentrated at a targeted area of interest. In some cases, the area of interest may vary in size, shape, and/or location within first reference image 128 and/or second reference image 132. In a non-limiting example the area of interest may be target or tissue sample within target. In some cases, the area of interest may specify one or more coordinates, distances, and the like. Image processing module 164 may then be configured to isolate the area of interest from first reference image 128 and/or second reference image 132 based on the particular feature.

With continued reference to FIG. 1, image processing module 164 may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module 164 may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module 164 may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module 164 as feature of interest, while other components may be discarded. Image processing module 164 may be further configured to extract feature of interest from an image for further processing. One or more first reference image 128 and/or second reference image 132 may be transmitted from processor 124 to image processing module 164 via any suitable electronic communication protocol, including without limitation packet-based protocols such as transfer control protocolinternet protocol (TCP-IP), file transfer protocol (FTP) or the like. Receiving images may include retrieval of first reference image 128 and/or second reference image 132 from a data store containing images as described below; for instance, and without limitation, images may be retrieved using a query that specifies a timestamp that images may be required to match.

With continued reference to FIG. 1, in some embodiments, processor 124 may be configured to analyze first reference image 128 and/or second reference image 132 using machine vision system to extract reference features 116 and determine image metrics 148a-b. For the purposes of this disclosure, a "machine vision system" is a type of technology that enables a computing device to inspect, evaluate and identify still or moving images. In some cases, a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or first reference image 128 and second reference image 132) relative a two or three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, in some embodiments, processor 124 may analyze first reference image 128 and second reference image 132 using a field coordinate system to extract image metric 148*a-b* and determine reference deviation 152. A "field coordinate system," as used herein is a coordinate system of an image of a physical space. As a non-limiting example, field coordinate system may include a Cartesian coordinate system, a polar coordinate system, or the like. In some embodiments, field coordinate system represent a position of imaging reference 104. In some embodiments, a position of imaging reference 104 within the field coordinate system may be static. In some embodiments, field coordinate system may include a three-dimensional coordinate system. An origin point of the field coordinate system may be selected, without limitation, for convenience of calculation, such as selection of a pixel on first reference image 128 and second reference image 132 may include without limitation an origin point on a coordinate system of the first reference image 128 and second reference image 132. In some embodiments, imaging reference 104 or reference feature 116 may be an origin point of the field coordinate system.

With continued reference to FIG. 1, in some embodiments, processor 124 may be configured to generate metric training data. In a non-limiting example, metric training data may include correlations between exemplary reference images, exemplary reference features and exemplary image metrics. In some embodiments, metric training data may be stored in reference database 140. In some embodiments, metric training data may be received from one or more users, reference database 140, external computing devices, and/or previous iterations of processing. As a non-limiting example, metric training data may include instructions from a user, who may be an expert user, a past user in embodiments disclosed herein, or the like, which may be stored in memory and/or stored in reference database 140, where the instructions may include labeling of training examples. In some embodiments, metric training data may be updated iteratively on a feedback loop. As a non-limiting example, processor 124 may update metric training data iteratively through a feedback loop as a function of user feedback, first reference image 128 and/or second reference image 132, reference feature 116, or the like. In some embodiments, processor 124 may be configured to generate a metric machine-learning model. In a non-limiting example, generating metric machine-learning model may include training, retraining, or fine-tuning metric machine-learning model using metric training data or updated metric training data. In some embodiments, processor 124 may be configured to detect image metrics 148*a-b* in first reference image 128 and/or second reference image 132 using metric machine-learning model (i.e. trained or updated metric machine-learning model). In some embodiments, generating training data and training machine-learning models may be simultaneous.

With continued reference to FIG. 1, memory 136 contains instructions configuring processor 124 to detect a reference deviation 152 in one or more image metrics 148*a-b* between first reference image 128 and second reference image 132. For the purposes of this disclosure, a "reference deviation" is a quantifiable difference in an image, image quality or system performance between a first reference image and second reference image. As a non-limiting example, reference deviation 152 may include chromatic aberration, alignment, focus inaccuracy, geometric distortion, resolution inconsistency, and the like as described further in detail below. In some embodiments, by comparing image metrics 148*a-b* across first reference image 128 and second reference image 132, processor 124 may detect whether a statistically or operationally significant change (reference deviation 152) has occurred that may indicate an issue (deviation cause 156) such as optical contamination, mechanical drift, or calibration loss. As a non-limiting example, if a sharpness metric (image metric 148*a*) in first reference image 128 is measured at 0.92 and another sharpness metric (image metric 148*b*) in second reference image 132 is measured at 0.74, processor 124 may determine that a reference deviation 152 exists, exceeding a defined deviation threshold. In some embodiments, reference deviation 152 serves as an indicator of potential degradation in the imaging system's optical or mechanical performance during a scanning cycle. In some embodiments, reference deviation 152 may include repeating deviations, which refer to reference deviations that occur in a consistent or periodic manner across multiple scan operations.

With continued reference to FIG. 1, in some embodiments, processor 124 may compute the number of microns represented per pixel (MPP) by dividing the known physical distance by the measured pixel distance between imaging references 104 in reference images. In some embodiments, computed MPP value may be stored in memory 136 and applied to ensure spatial measurement accuracy across scans. In another non-limiting example, processor 124 may extract pixel-level color data from defined regions of interest (e.g., reference feature 116) of reference images compare them. In another non-limiting example, processor 124 may compare field boundaries of reference images. In another non-limiting example, processor 124 may identify a sharp vertical edge in the red, green, and blue channels, and may measure the horizontal or vertical pixel offset of that edge across the three channels to analyze reference images for chromatic aberration.

With continued reference to FIG. 1, for the purposes of this disclosure, a "deviation threshold" is a limit or boundary that indicates whether a change in one or more image metrics constitutes a significant reference deviation. In some embodiments, deviation threshold may include an absolute value, percentage change, or statistical boundary, and represents the minimum magnitude of difference between corresponding image metrics 148*a-b* in first reference image 128 and second reference image 132 that is considered operationally meaningful. In some embodiments, deviation thresholds may be established during system calibration, derived from historical system performance data, or dynamically adjusted based on environmental or workload conditions. In some embodiments, deviation thresholds may vary depending on image metric type and application context. As a non-limiting example, if a sharpness metric from first reference image 128 is measured at 0.92 and sharpness metric from second reference image 132 is measured at 0.74, and deviation threshold for sharpness is 0.10, then processor 124 may determine that the 0.18 difference exceeds the deviation threshold and constitutes a reference deviation 152. In some embodiments, processor 124 may retrieve deviation threshold from a reference database 140. In some embodiments, user may manually input deviation threshold.

With continued reference to FIG. 1, in some embodiments, detecting reference deviation 152 may include retrieving a metric baseline 168 from a database (e.g., reference database 140) and comparing one or more image metrics 148*a-b* to the metric baseline 168. For the purposes of this disclosure, "metric baseline" is a set of reference values that represent expected or acceptable performance characteristics of an imaging system under normal operating conditions. In some embodiments, metric baseline 168 may be established during system calibration, manufacturing, or from historical system behavior under verified optimal conditions. In some embodiments, processor 124 may access reference database 140 to obtain metric baseline 168 corresponding to relevant imaging reference 104 or scanning configuration. It may then compare image metrics 148*a-b* from first reference image 128 and second reference image 132 to the metric baseline 168 to determine reference deviation 152. As a non-limiting example, if the baseline resolution score is 0.90 and image metric 148*b* of the second reference image 132 is 0.76, processor 124 may determine that the deviation exceeds a predefined tolerance, thus confirming the presence of a reference deviation 152.

With continued reference to FIG. 1, memory 136 contains instructions configuring processor 124 to classify reference deviation 152 to a deviation cause 156 of the reference deviation 152. For the purposes of this disclosure, a "deviation cause" refers to a source of a detected change in one or more image metrics of a first reference image and second reference image. As a non-limiting example, deviation cause 156 may include optical contamination (e.g., debris or film on an objective lens), mechanical misalignment (e.g., stage drift or backlash), target-based irregularities (e.g., warping or surface residue), or hardware degradation (e.g., sensor instability or actuator error). As another non-limiting example, deviation cause 152 may include stage jitter, longitudinal instability, x, y misalignment, and the like. For the purposes of this disclosure, "stage jitter" refers to fluctuations in stage position that occur during image acquisition. In a non-limiting example, stage jitter may be detected by observing inconsistencies in image sharpness or motion artifacts across reference images. For the purposes of this disclosure, "longitudinal instability" refers to a drift or positional error in a scanning stage over time. In a non-limiting example, longitudinal instability may be detected by comparing a position of a reference feature 116 or imaging reference 404 to its baseline coordinates across multiple scans. For the purposes of this disclosure, "x, y misalignment" refers to deviation in a lateral plane of a scanning stage. In a non-limiting example, x, y misalignment may be detected by analyzing an offset between expected and actual positions of reference features in consecutive first reference images 128 and second reference image 132. In some embodiments, processor 124 may use rule-based logic, statistical thresholds, or machine learning models trained on labeled reference deviations 152 to assign appropriate deviation cause 156. As a non-limiting example, a drop in sharpness coupled with no change in geometric alignment may lead processor 124 to classify reference deviation 152 as being caused by optical contamination (deviation cause 156). As another non-limiting example, if reference deviation 152 involves a lateral shift in reference features 116 without a sharpness drop, processor 124 may classify the reference deviation 152 as a mechanical alignment error (deviation cause 156). Determining root cause (deviation cause 156) of image sharpness issues (reference deviation 152) is challenging because no in-line verification mechanism exists between target scanning. This results in manual interventions, causing inefficiencies and potential diagnostic errors, especially in cytology and microbiology, where detecting fine structures is crucial.

With continued reference to FIG. 1, in some embodiments, classifying reference deviation 152 may include classifying a focus inaccuracy of reference deviation 152 to an optical contamination of the deviation cause 156. For the purposes of this disclosure, "focus inaccuracy" refers to a measurable degradation in image sharpness or focal precision between first reference image and second reference image. In some embodiments, classifying reference deviation 152 comprises classifying a focus inaccuracy of the reference deviation 152 to an optical contamination of deviation cause 156 as a function of a degradation in sharpness metrics in second reference image 132 relative to first reference image 128. As a non-limiting example, sharpness metrics may include edge contrast, gradient strength, or high-frequency content between second reference image 132 and first reference image 128. In a non-limiting example, when such a focus-related deviation is detected without corresponding geometric shifts or resolution loss, processor 124 may determine that deviation cause 156 is optical contamination, such as the presence of dust, smudges, or other obstructive material on the optical elements (e.g., objective lens or protective glass). For the purposes of this disclosure, "optical contamination" refers to a presence of unwanted material or residue on one or more optical components of scanner. In some embodiments, optical contamination may adversely affect passage, clarity, or focus of light through scanner 112. In a non-limiting example, optical contamination may impair optical path and result in degraded image quality. In some embodiments, optical contamination may include, but is not limited to, dust particles, smudges, fingerprints, condensation, oil residues, or debris deposited on critical optical surfaces such as the objective lens, protective covers, or internal glass elements. Optical contamination may scatter, absorb, or refract incoming or outgoing light, leading to blurred, diffused, or distorted image data. As a non-limiting example, when processor 124 detects a sharpness degradation (reference deviation 152) in second reference image 132 relative to first reference image 128 without corresponding geometric distortion or resolution loss, it may classify the reference deviation 152 as being caused by optical contamination.

With continued reference to FIG. 1, in some embodiments, classifying reference deviation 152 may include classifying a geometric distortion of reference deviation 152 to a stage positioning error of deviation cause 156. In some embodiments, classifying reference deviation 152 may include classifying a geometric distortion of the reference deviation 152 to a stage positioning error of deviation cause 156 as a function of a repetitive displacement of reference features 116 in second reference image 132 relative to first reference image 128. A repetitive displacement refers to a measurable and repeatable change in the position of the same reference features from first reference image 128 to second reference image 132. As a non-limiting example, repetitive displacement of reference features 116 may include translation, rotation, skew, or scaling that affects the geometric layout of reference features 116. As used in this disclosure, "geometric distortion" refers to a deviation in the spatial alignment or shape of reference features in second reference image compared to first reference image. As a non-limiting example, geometric distortion may include translation, rotation, or non-uniform scaling of reference patterns. When geometric distortion is present without corresponding sharpness or resolution degradation, processor 124 may classify deviation cause 156 as a stage positioning error. For the purposes of this disclosure, "stage positioning error" refers to a deviation in spatial position or movement of a scanning stage during a scanning operation. In some embodiments, stage positioning error may result in misalignment, displacement, or distortion of captured image (second reference image 132) relative to a known reference (metric baseline 168 or image metric 148a of first reference image 128). In some embodiments, stage positioning error may occur due to mechanical instability, actuator inaccuracy, backlash, slippage, thermal expansion, or degradation of stage control components. In some embodiments, stage positioning error may manifest as geometric distortion in second reference image 132 when compared to first reference image 128. In a non-limiting example, distortions may indicate that scanning stage 108 has failed to maintain precise and repeatable positioning during target scanning. As a non-limiting example, if reference features 116 captured in second reference image 132 appear shifted laterally or rotated relative to their positions in first reference image 128, processor 124 may classify the reference deviation 152 as resulting from stage positioning error. In a non-limiting example, by computing MPP values, processor 124 may determine that deviation cause 156 indicates a scaling error or field distortion, the system may automatically perform MPP recalibration to restore correct spatial scaling. In another non-limiting example, deviation between pixel-level color data may be classified to deviation cause 156 of a color inconsistency or stain misrepresentation.

With continued reference to FIG. 1, in some embodiments, classifying reference deviation 152 may include classifying a resolution inconsistency of reference deviation 152 to a hardware malfunction of deviation cause 156. For the purposes of this disclosure, "resolution inconsistency" refers to a change in a system's ability to resolve fine structural features. In some embodiments, classifying reference deviation 152 may include classifying a resolution inconsistency of the reference deviation 152 to a hardware malfunction of deviation cause 156 as a function of a degradation in visibility metrics of reference features 116 in second reference image 132. In a non-limiting example, resolution inconsistency may be identified by a loss in clarity of resolution target or reduced metric values such as line-pair visibility or modulation contrast. When resolution inconsistency is detected, processor 124 may classify deviation cause 156 as a hardware malfunction. In some embodiments, hardware malfunction may include sensor instability, signal degradation, actuator failure, or degradation of optical components such as lenses or mirrors. For the purposes of this disclosure, "hardware malfunction" refers to a failure, degradation, or operational instability in one or more physical components of a scanner that adversely affects imaging performance and contributes to the occurrence of a reference deviation. In some embodiments, hardware malfunctions may impair a system's ability to maintain consistent resolution, alignment, or signal quality during a scanning operation. In some embodiments, hardware malfunction may include, but is not limited to, sensor instability (e.g., fluctuating or degraded image sensor output), signal degradation (e.g., electrical noise or transmission errors), actuator failure (e.g., inconsistent or incomplete stage movement), or optical component degradation (e.g., wear, misalignment, or damage to lenses, mirrors, or filters). In some embodiments, hardware malfunction may reduce a system's ability to resolve fine details, resulting in a resolution inconsistency, which may be identified by processor 124 through a drop in image metric values (e.g., diminished line-pair visibility or reduced modulation contrast) observed between first reference image 128 and second reference image 132. As a non-limiting example, if resolution target appears blurry or partially unresolved in second reference image 132, despite correct focus and stable mechanical alignment, processor 124 may classify the resolution inconsistency as a hardware malfunction.

With continued reference to FIG. 1, in some embodiments, processor 124 may be configured to generate cause training data 172. In a non-limiting example, cause training data 172 may include correlations between exemplary reference deviations and exemplary deviations causes. In some embodiments, cause training data 172 may be stored in reference database 140. In some embodiments, cause training data 172 may be received from one or more users, reference database 140, external computing devices, and/or previous iterations of processing. As a non-limiting example, cause training data 172 may include instructions from a user, who may be an expert user, a past user in embodiments disclosed herein, or the like, which may be stored in memory and/or stored in reference database 140, where the instructions may include labeling of training examples. In some embodiments, cause training data 172 may be updated iteratively on a feedback loop. As a non-limiting example, processor 124 may update cause training data 172 iteratively through a feedback loop as a function of user feedback, first reference image 128 and/or second reference image 132, reference deviation 152, deviation cause 156, image metrics 148a-b, or the like. In some embodiments, processor 124 may be configured to generate a cause machine-learning model 176. In a non-limiting example, generating cause machine-learning model 176 may include training, retraining, or fine-tuning cause machine-learning model 176 using cause training data 172 or updated cause training data 172. In some embodiments, processor 124 may be configured to classify reference deviation to deviation cause 156 using cause machine-learning model 176 (i.e. trained or updated cause machine-learning model 176). In some embodiments, generating training data and training machine-learning models may be simultaneous. In some embodiments, cause machine-learning model 176 may include a classifier, which is a machine-learning model, such as a mathematical model, neural net, or program generated by a machine learning algorithm known as a "classification algorithm," that sorts reference deviation related inputs into categories or bins of data, outputting one or more deviation causes associated therewith. In some embodiments, cause machine-learning model 176 may be consistent with a classifier disclosed with respect to FIG. 7.

With continued reference to FIG. 1, memory 136 contains instructions configuring processor 124 to generate an alert signal 160 as a function of deviation cause 156, wherein the alert signal 160 is configured to initiate an automated calibration process. For the purposes of this disclosure, an "automated calibration process" refers to an operation that adjusts imaging metrics without requiring manual intervention by a user or technician. In some embodiments, automated calibration process may be triggered before, during, or after a scanning operation. In some embodiments, automated calibration process may include multiple calibration operations executed sequentially or concurrently. In some embodiments, processor 124 may determine which specific calibration routines to perform based on deviation cause 156, historical calibration data stored in reference database 140, or the confidence level associated with a detected reference deviation 152. In some embodiments, automated calibration process may include MPP calibration, color calibration, FOV calibration, and the like. For example, and without limitation, if a deviation cause 156 indicates a scaling error or field distortion using MPP computation, processor 124 may automatically perform MPP recalibration to restore correct spatial scaling. For example, and without limitation, for deviation cause 156 of a color inconsistency or stain misrepresentation, automated calibration process may include color calibration to correct chromatic deviations automatically. For example, and without limitation, if deviation cause 156 involves geometric distortion or misalignment of image tiling, processor 124 may automatically adjust FOV parameters to correct reference deviation 152. In some embodiments, automated calibration process may be configured to improve mechanical system performance.

With continued reference to FIG. 1, for the purposes of this disclosure, "alert signal" is a signal that indicates information related to a reference deviation or actions to revert the reference deviation. In some embodiments, alert signal 160 may include metadata specifying the type of deviation cause 156 along with associated image metrics 148*a-b*, timestamps, scanner identifiers, and diagnostic confidence levels. In some embodiments, alert signal 160 may allow downstream algorithm 180 or users to take appropriate action based on the nature and severity of deviation cause 156. As a non-limiting example, if deviation cause 156 is a stage positioning error, alert signal 160 may prompt a recalibration procedure or pause in scanning operations. As another non-limiting example, if deviation cause 156 is optical contamination, alert signal 160 may instruct automated cleaning protocols or notify a technician or user to inspect the lens of optical sensor 120 or scanner 112. In some embodiments, alert signal 160 may be transmitted to an external quality control system, logged in a performance history database, or used to adjust algorithmic processing parameters in real time. In some embodiments, alert signal 160 may be configured to instruct a downstream algorithm 180 to modify an interpretation of image data associated with target, wherein the downstream algorithm 180 may include an image processing module 164. For the purposes of this disclosure, a "downstream algorithm" is any processing logic that operates on image data of target. As a non-limiting example, downstream algorithm may include digital pathology analysis, feature detection, segmentation, classification, or diagnostic inference. In a non-limiting example, an alert signal 160 may instruct downstream algorithm 180 to apply alternate thresholds, suppress certain inferences, increase uncertainty weights, or flag image data for manual review. For the purposes of this disclosure, "image data" is data related to images of targets. As a non-limiting example, if alert signal 160 indicates a resolution inconsistency due to hardware malfunction, image processing module 164 may reduce confidence of morphological feature detection or exclude the affected region from diagnostic scoring.

With continued reference to FIG. 1, in some embodiments, generating alert signal 160 may include generating the alert signal 160 as a function of optical contamination of deviation cause 156, wherein the alert signal 160 may be configured to command a debris cleaning system to perform optical cleaning. As used in this disclosure, a "debris cleaning system" refers to a system that contains a device or set of devices designed to eliminate or reduce contaminants on a target. In an embodiment, debris cleaning system may remove optical contamination from optical path or slide upon activation, wherein processor 124, in some cases, may active debris cleaning system as a function of alert signal 160, and detected optical contamination may be removed by debris cleaning system according to a contaminant cleaning protocol. In some cases, debris cleaning system may include one or more physical cleaning tools such as, without limitation, brushes or wipers having soft bristles or materials that gently sweep surfaces of components disposed in between optical path e.g., scanning stage 108, target, scanner 112, imaging reference 104, optical sensor 120, and of the like. In some cases, physical cleaning tools may be mechanically attached to actuator mechanism, allowing for automated and precise movement and/or positioning of physical cleaning tools to target specific areas. Actuator mechanism may control pressure, angle, and motion of one or more physical cleaning tools according to contaminant cleaning protocol. In a non-limiting example, a brush attached to actuator mechanism may be configured, by processor 124, to sweep across the top surface of scanning stage 108 or cover of target securely positioned on scanning stage 108 in a specific pattern, thereby removing optical contamination such as dust and undesired debris that may interfere with the slide imaging process. Debris cleaning system that performs optical cleaning disclosed herein may be consistent with a system with contaminant removal mechanism found in U.S. patent application Ser. No. 18/382,345, filed on Oct. 20, 2023, entitled "SYSTEM AND METHODS FOR DETECTING AND CLEANING CONTAMINANTS FROM AN IMAGING OPTICAL PATH," which is incorporated herein by reference in its entirety.

With continued reference to FIG. 1, in some embodiments, alert signal 160 may be configured to notify a user any information related to reference deviation 152 and deviation cause 156 using a user interface 184. In some embodiments, alert signal 160 may trigger a display of notifications, historical performance data, suggested corrective actions, or status indicators. In some embodiments, user interface 184 may visually distinguish between different types of deviation causes 156 and include time-stamped logs, color-coded alerts, or severity ratings. As a non-limiting example, if processor 124 detects a sharpness reduction between first reference image 128 and second reference image 132 and classifies the deviation cause 156 as optical contamination, alert signal 160 may prompt user interface 184 to display a notification stating: "Alert: Optical degradation detected. Sharpness deviation exceeds allowable threshold. Likely cause: objective lens contamination. Recommended action: inspect and clean optical components." As another non-limiting example, if the deviation cause 156 is classified as stage positioning error, user interface 184 may display: "Warning: Mechanical alignment issue detected. Geometric distortion identified between pre-scan and post-scan reference images. Recommended action: recalibrate scanning stage."

With continued reference to FIG. 1, in some embodiments, processor 124 may be configured to collect, log, and analyze imaging metrics 148*a-b*, reference deviations 152, deviation causes 156, and the like. In some embodiments, processor 124 may determine one or more quality scores as a function of the collection or log of imaging metrics 148*a-b*, reference deviations 152, deviation causes 156, and the like. For the purposes of this disclosure, a "quality score" is a value that represents an operational performance or image integrity of a system during a scanning operation. In some embodiments, quality score may serve as a standardized metric used to assess, monitor, and track the condition of scanner 112 or scanning operation. In some embodiments, quality score may be applied to a single scan, a group of scans, or an aggregated operational window. By continuously monitoring and scoring system performance over time, the predictive maintenance functionality enables system 100 to maintain operational integrity, reduce the risk of imaging artifacts, and ensure that quality assurance remains tightly integrated with routine scanning activities. In some embodiments, if a processor 124 detects a declining trend or deviation in quality score beyond a defined threshold, processor 124 may generate a maintenance flag or alert signal 160, prompting inspection, recalibration, or preventative actions.

With continued reference to FIG. 1, for the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 124. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some embodiments, processor 124 may register imaging reference 104 as an anti-tamper element for anti-tamper protection. In some embodiments, registration may be performed using one or more image registration algorithms. As a non-limiting example, image registration algorithms may include rigid registration, affine registration, feature-based registration (e.g., Scale-Invariant Feature Transform [SIFT] or Oriented FAST and Rotated BRIEF [ORB], intensity-based registration, and the like. In some embodiments, imaging reference 104 may include unique patterns (e.g., reference features 116) that can be imaged and digitally verified by processor 124 during the scanning workflow. For example, and without limitation, if characteristics of imaging reference 104 in reference images deviate (e.g., reference deviation 152) from a baseline profile (e.g., metric baseline 168), processor 124 may generate alert signal 160 for potential tampering or unauthorized recalibration. In some embodiments, registered imaging reference 104 may serve as a cryptographic anchor for scanner identification. In some embodiments, physical characteristics (e.g., reference feature 116) of imaging reference 104 may be used to derive a scanner-specific digital signature. This signature may be generated using a cryptographic hash function or public-key infrastructure (PKI) and securely embedded in the metadata of acquired image files. Downstream algorithms 180 or systems or reviewers may use this signature to verify that reference images were acquired using an authorized, unmodified scanner, and that the scanning conditions were not altered post-acquisition.

Figure 2:
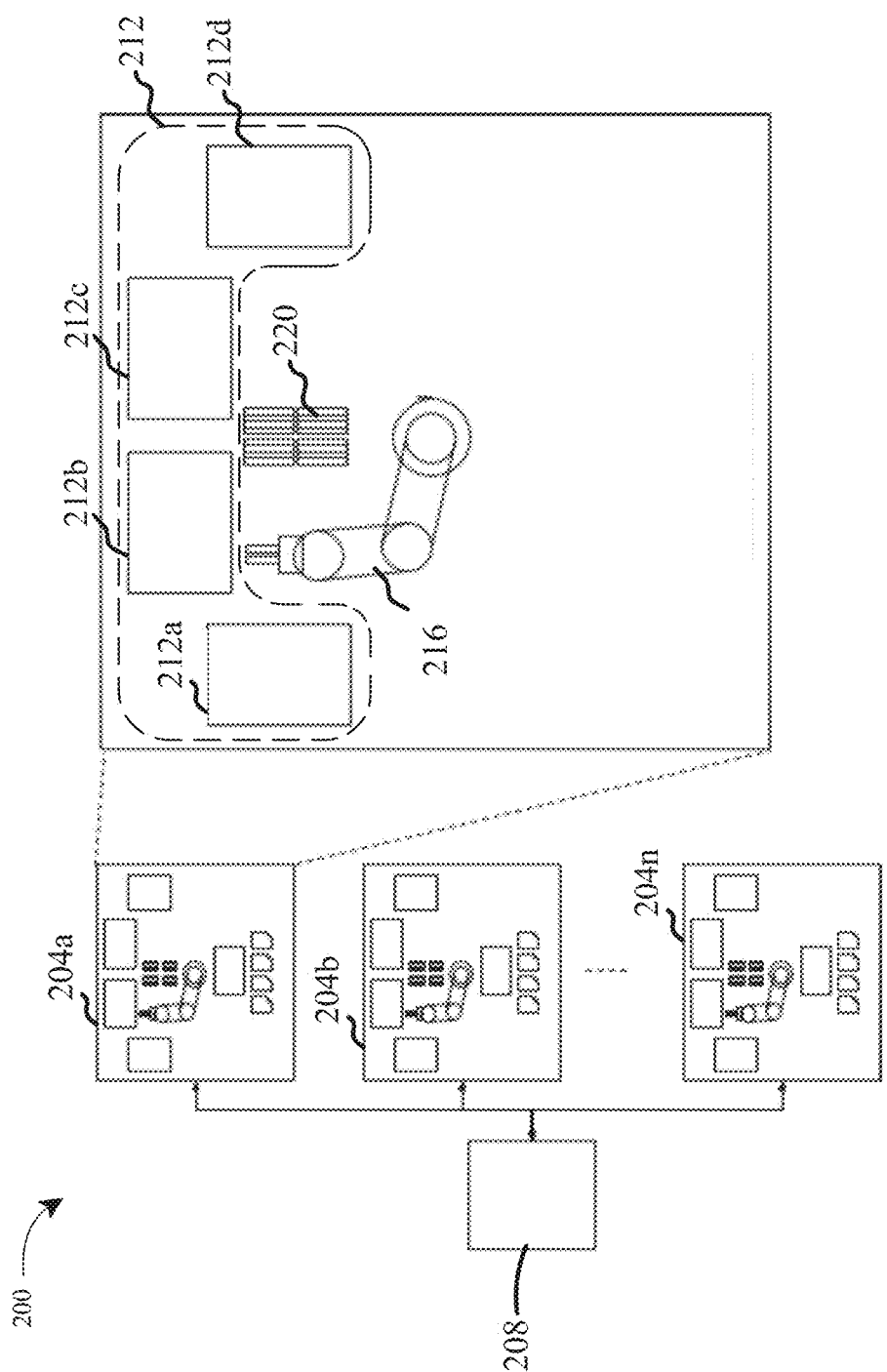
FIG. 2 illustrates a configuration of an exemplary system including a cluster of scanners.

Referring now to FIG. 2, a configuration of an exemplary system 200 including clusters 204*a*-*n* of scanners 212. System 200 includes processor 208. In a non-limiting example, processor 208 may include a plurality of processors. For example, and without limitation, processor 208 may include a cluster management system. In some cases, cluster management system and/or processor 208 may be configured to receive sensor data from sensors positioned on scanners 212*a*-*d*. In FIG. 2, cluster 204*a* is illustrated in detail. Cluster 204*a* includes four scanners 212*a*-*d* as shown in FIG. 2. Clusters 204*a*-*n* may include an interacting device 216. For the purposes of this disclosure, an "interacting device" is a device that interacts with a scanner to perform a specific task. Exemplary interacting device 216 may include a robotic arm. For the purposes of this disclosure, a "robotic arm" is a mechanical device or manipulator that mimics the structure and function of a human arm. In a non-limiting example, a robotic arm may pick up target 220 from a first target storage, carry the target 220 to scanner 212 and place the target 220 on the scanner 212. Then, continuing the non-limiting example, the robotic arm may pick the target 220 from the scanner 212, carry the target 220 to a second target storage and drop the target 220 off to the second target storage. In a non-limiting example, a robotic arm may pick up a target from a target storage, carry the target to scanner 212 and place the target 220 on the scanner 212. Then, continuing the non-limiting example, the robotic arm may pick the target 220 from the scanner 212, carry the target 220 to the target storage and drop the target off to the target storage. Processor 208 may be communicatively connected to interacting device 216 and/or cluster management system. Additional disclosure related to a cluster of scanners 212 may be found in U.S. patent application Ser. No. 18/538,959, filed on Dec. 13, 2013, entitled "APPARATUS AND METHOD OF HOT-SWAPPING A COMPONENT OF A COMPONENT UNIT IN A CLUSTER," which is incorporated herein by reference in its entirety.

Referring now to FIG. 3, configurations of exemplary imaging references 300*a*-*d* are illustrated. In some embodiments, each imaging reference 300*a*-*d* may include one or more reference features. Imaging references 300*a*-*d* illustrated in FIG. 3 are merely examples and are not intended to be limiting. In some embodiments, imaging reference 300*a* may include a circular crosshair pattern with orthogonal intersecting lines and concentric circular boundaries. In a non-limiting example, imaging reference 300*a* may be used to evaluate focus accuracy and/or detect misalignment as the central intersection point and defined line edges provide high-contrast features that are sensitive to minor defocus. In a non-limiting example, imaging reference 300*a* may serve as a geometric anchor for rotational or translational comparisons between reference images. In some embodiments, when system is out of focus, visibility and crispness of orthogonal intersecting lines degrade noticeably, making circular crosshair pattern a reliable indicator of optical sharpness. In some embodiments, imaging reference 300*a* may be used to detect misalignment using geometric symmetry of orthogonal intersecting lines and concentric circular boundaries. In some embodiments, rotational or translational shifts between first and second reference images can be measured by comparing the displacement or angular change in the position of the symmetric elements, allowing imaging reference 300a to serve as a geometric anchor for alignment comparisons.

With continued reference to FIG. 3, in some embodiments, imaging reference 300b may include a radial spoke pattern extending outward from a central point. In some embodiments, imaging reference 300b may be used to assess angular resolution fidelity as the radial lines become increasingly narrow and angularly separated as they extend from the center. In some embodiments, imaging reference 300b may be used to detect lens aberrations, vignetting, or rotational distortion. The ability of a imaging system to resolve and distinguish between the radial spoke pattern provides a direct measure of angular resolving power. Any curvature, asymmetry, or fading of the spokes toward the periphery of the image can indicate the presence of spherical aberration, uneven illumination, or optical misalignment.

With continued reference to FIG. 3, in some embodiments, imaging reference 300c may be a bar-pattern resolution target with line pairs arranged at varying spacings and orientations. In some embodiments, imaging reference 300c may be designed for fine-grained resolution testing as it provides precisely spaced line pairs that allow a processor to determine the smallest spatial frequency that remains distinguishable. The contrast and clarity of the bars can be evaluated to compute modulation transfer function (MTF), resolution thresholds, or contrast ratios. Because the bars are oriented in multiple directions, imaging reference 300c can also be used to assess anisotropic resolution performance.

With continued reference to FIG. 3, in some embodiments, imaging reference 300d may include a nested square pattern with progressively smaller inner rectangles. In some embodiments, imaging reference 300d may support analysis of geometric distortion because any warping, skewing, or irregular scaling of the nested shapes will be readily visible when compared to the known rectilinear geometry. In some embodiments, imaging reference 300d may be used to identify spatial scaling, allowing a processor to measure whether image magnification or scaling is consistent across the field. In some embodiments, because the nested structure converges toward a central region, it may allow for precise evaluation of central focus consistency, helping detect focus falloff or curvature-of-field effects. Deviations from expected square symmetry may indicate issues such as sensor misalignment, lens tilt, or non-linear optical behavior.

Figure 4A:
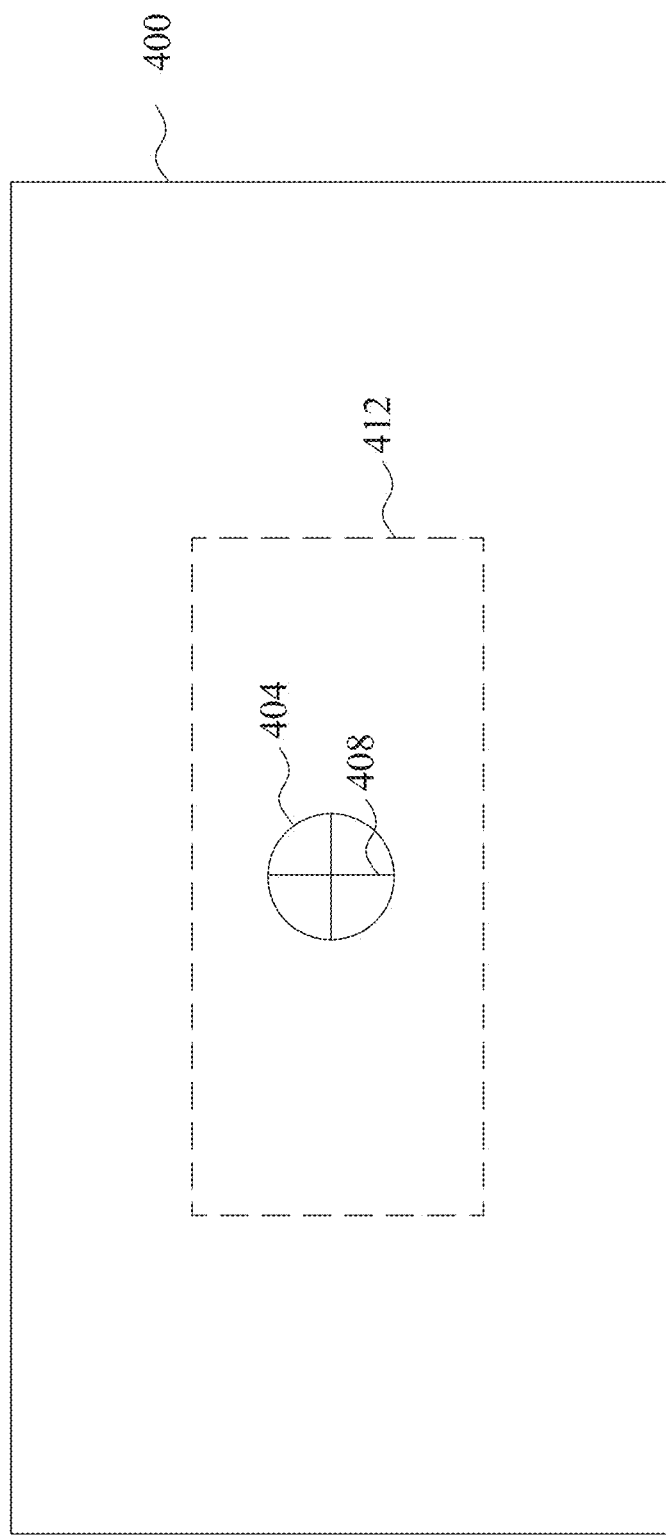
FIGS. 4A-B illustrate configurations of an exemplary scanning stage with an exemplary imaging reference.
Figure 4B:
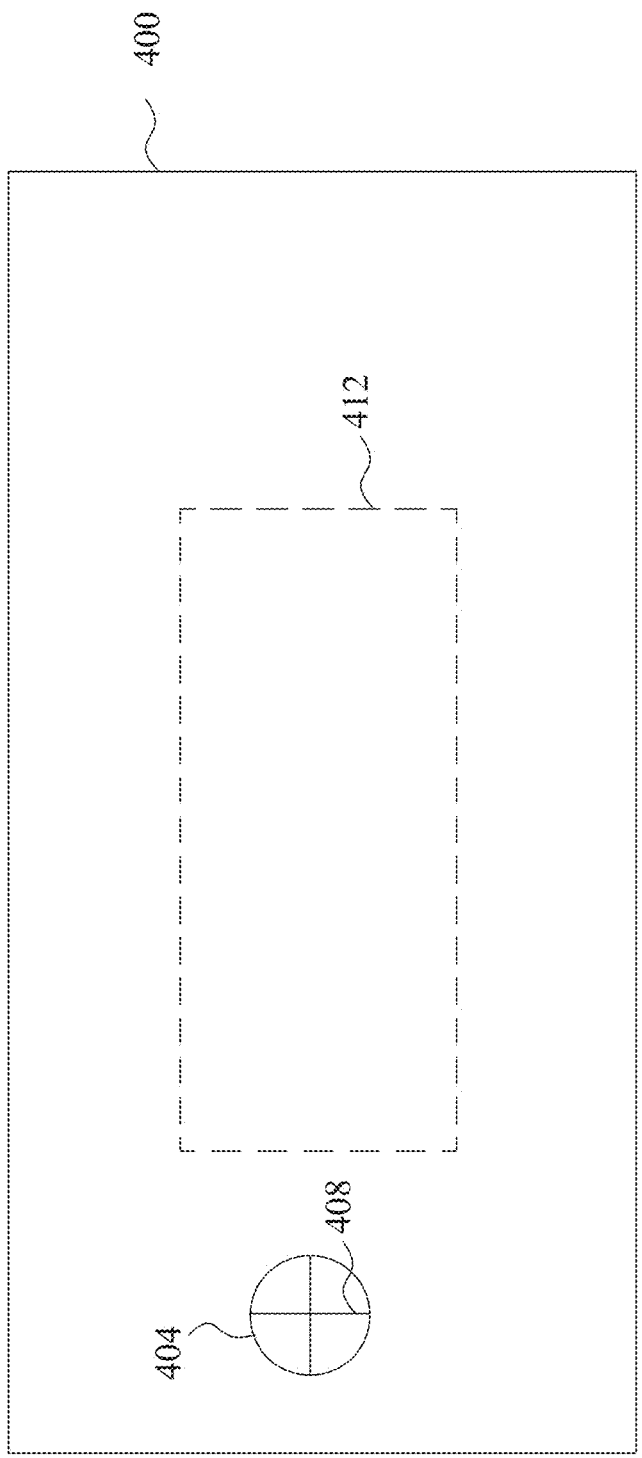

Referring now to FIGS. 4A-B, configurations of an exemplary scanning stage 400 with an exemplary imaging reference 404 are illustrated. In some embodiments, scanning stage 400 may provide a flat and stable surface configured to support one or more targets during a scanning operation. In some embodiments, imaging reference 404 may be embedded directly on scanning stage 400 and positioned adjacent to a target position 412. In some embodiments, target position 412 may be an area in which a microscope target is received and aligned for optical imaging. In some embodiments, imaging reference 404 may include one or more reference features 408. In FIGS. 4A-B, reference feature 408 includes intersecting lines forming a crosshair. As shown in FIG. 4A, in some embodiments, imaging reference 404 may be located in the middle of target position 412 on scanning stage 400. As shown in FIG. 4B, in some embodiments, imaging reference 404 may be located in adjacent to target position 412 on scanning stage 400. In some embodiments, imaging reference 404 may be located on the right, left, top, bottom or any sides of target position 412 on scanning stage 400. Whether positioned to the left, right, top, bottom, or at a corner of target position 412, imaging reference 404 remains fixed in location relative to scanning stage 400, such that it can be consistently captured by the scanner's optics before and after scanning operations.

Figure 5:
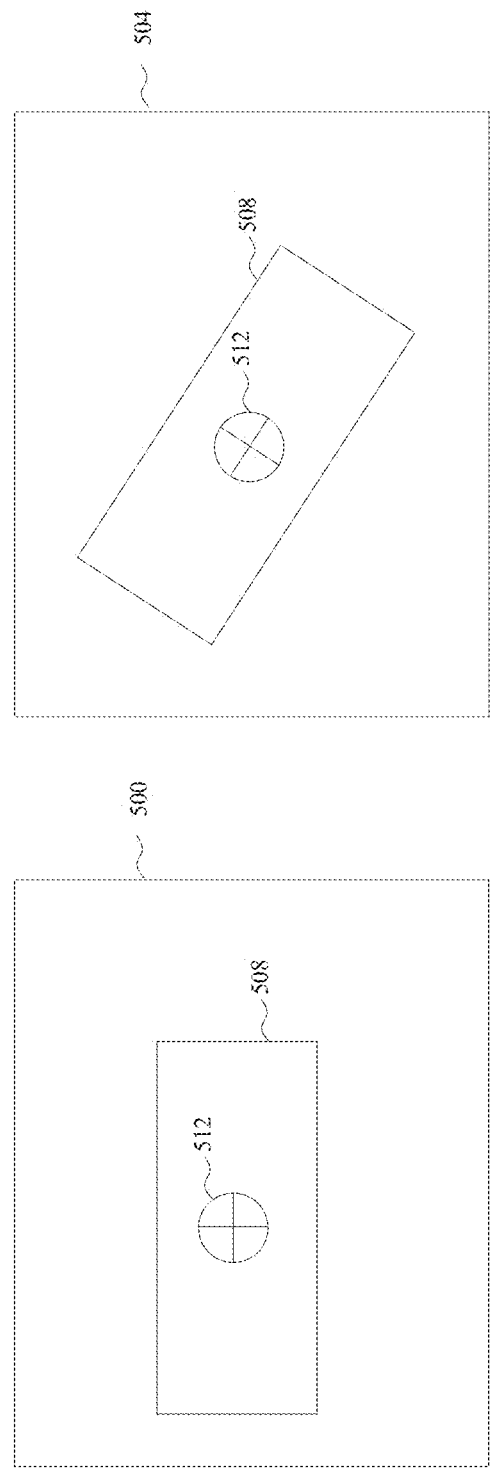
FIG. 5 illustrates a configuration of an exemplary first reference image and an exemplary second reference image.

Referring now to FIG. 5, a configuration of an exemplary first reference image 500 and second reference image 504 is illustrated. As shown in FIG. 5, both first reference image 500 and second reference image 504 capture an imaging reference 512 located on a scanning stage 508, where imaging reference 512 includes one or more fixed reference features. First reference image 500, shown on the left side of FIG. 5, illustrates imaging reference 512 in a properly aligned and undistorted state. The imaging reference 512 appears centered, symmetrical, and geometrically consistent, indicating stable imaging conditions at the start of a scanning operation. In contrast, second reference image 504, shown on the right side of FIG. 5, exhibits visible geometric distortion (reference deviation) of the same imaging reference 512. The deviation between first reference image 500 and second reference image 504 may be indicative of a reference deviation, specifically a geometric distortion, which may be classified by processor 124 as being caused by a stage positioning error, such as unintentional rotation, translation, or tilt of scanning stage 508 or scanner during operation.

Figure 6:
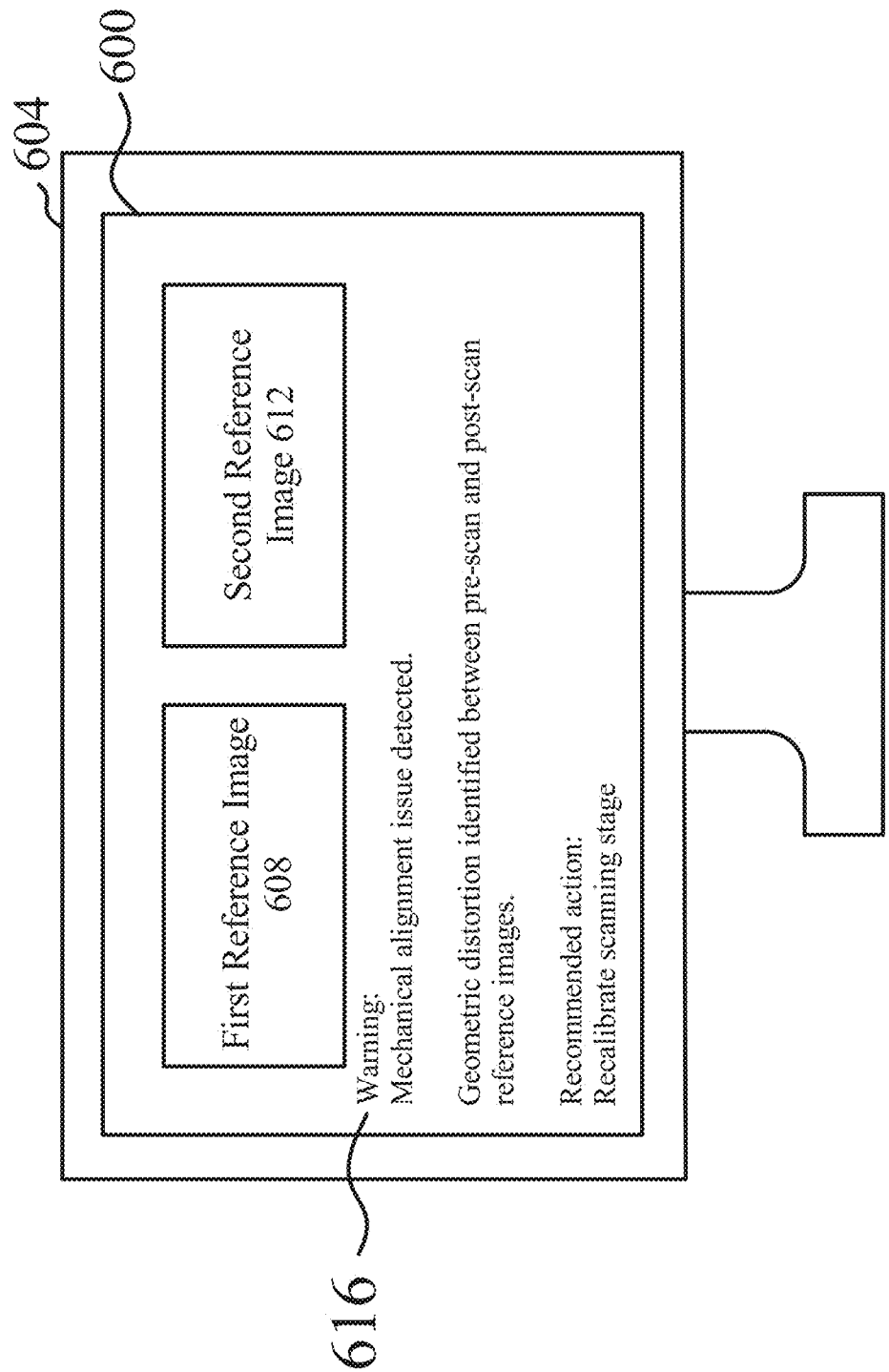
FIG. 6 illustrates an exemplary user interface.

Referring now to FIG. 6, an exemplary user interface 600 is illustrated. In some embodiments, user interface 600 may be displayed on remote device 604. In some embodiments, user interface 600 may include first reference image 608 and second reference image 612. In some embodiments, user interface 600 may include an alert signal 616. For example, and without limitation, alert signal 616 may alert a user related to reference deviation, deviation cause and recommended action to revert reference deviation and deviation cause. In a non-limiting example, as illustrated in FIG. 6, user interface 600 may include "Warning: Mechanical alignment issue detected. Geometric distortion identified between pre-scan and post-scan reference images. Recommended action: recalibrate scanning stage."

Figure 7:
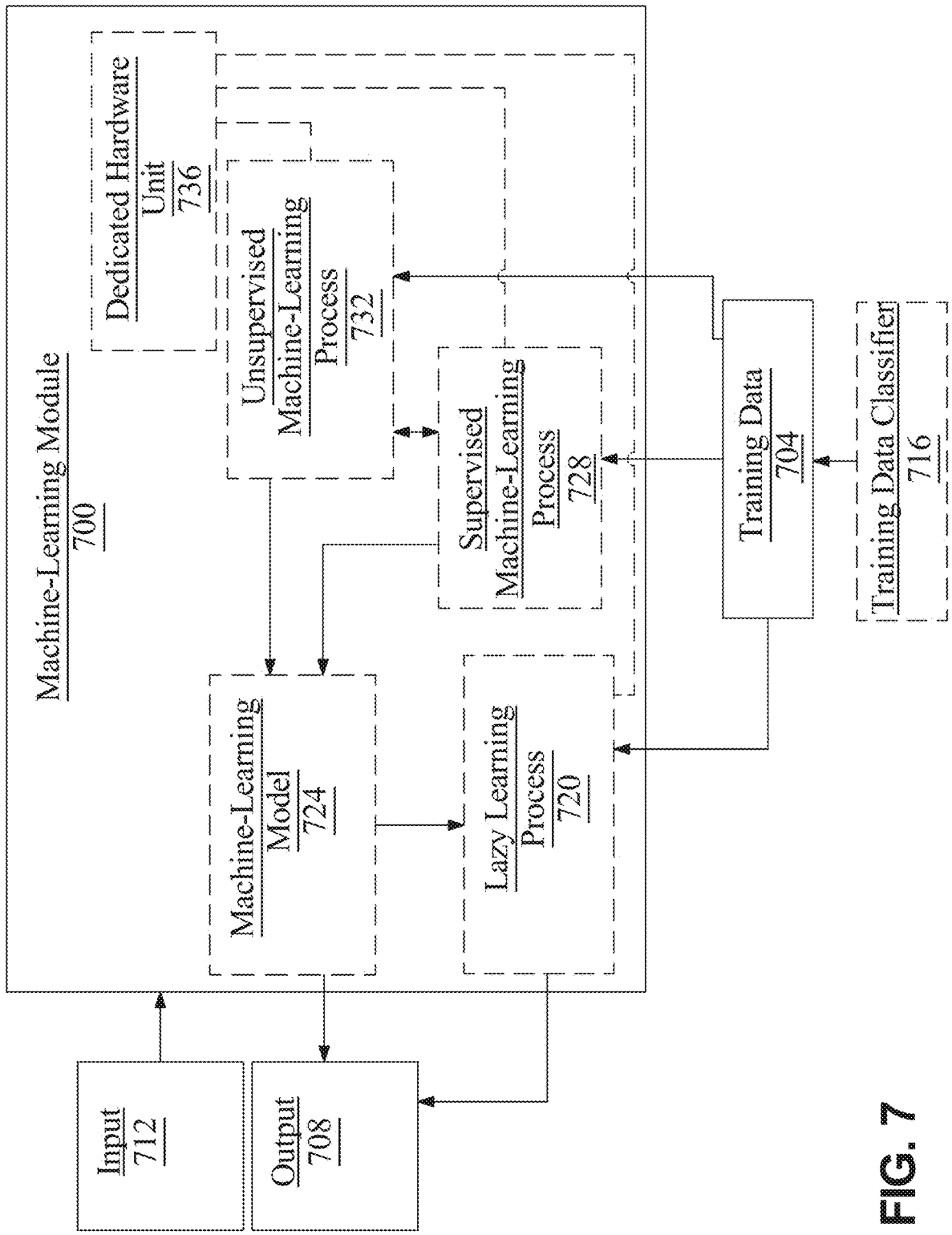
FIG. 7 illustrates a block diagram of an exemplary machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm instantiated in hardware or software logic, data structures, and/or functions that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, input data may include first reference image 128, second reference image 132, image metrics 148a-b, reference deviation 152, and the like. As a non-limiting illustrative example, output data may include image metrics 148a-b, reference deviation 152, deviation cause 156, and the like.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to operation cohort associated with types of samples, types of scanning operation, types of research, types of scanner, and the like.

Still referring to FIG. 7, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 7, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 7, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 7, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 7, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 7, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 7, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 7, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 7, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 7, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 7, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 7, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first reference image 128, second reference image 132, image metrics 148*a-b*, reference deviation 152, and the like as described above as inputs, image metrics 148*a-b*, reference deviation 152, deviation cause 156, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

With further reference to FIG. 7, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 7, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 732 may not require a response variable; unsupervised processes 532 may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 7, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 7, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 7, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 7, one or more processes or algorithms described above may be performed by at least a dedicated hardware unit 736. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 736 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 736 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 736 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 8:
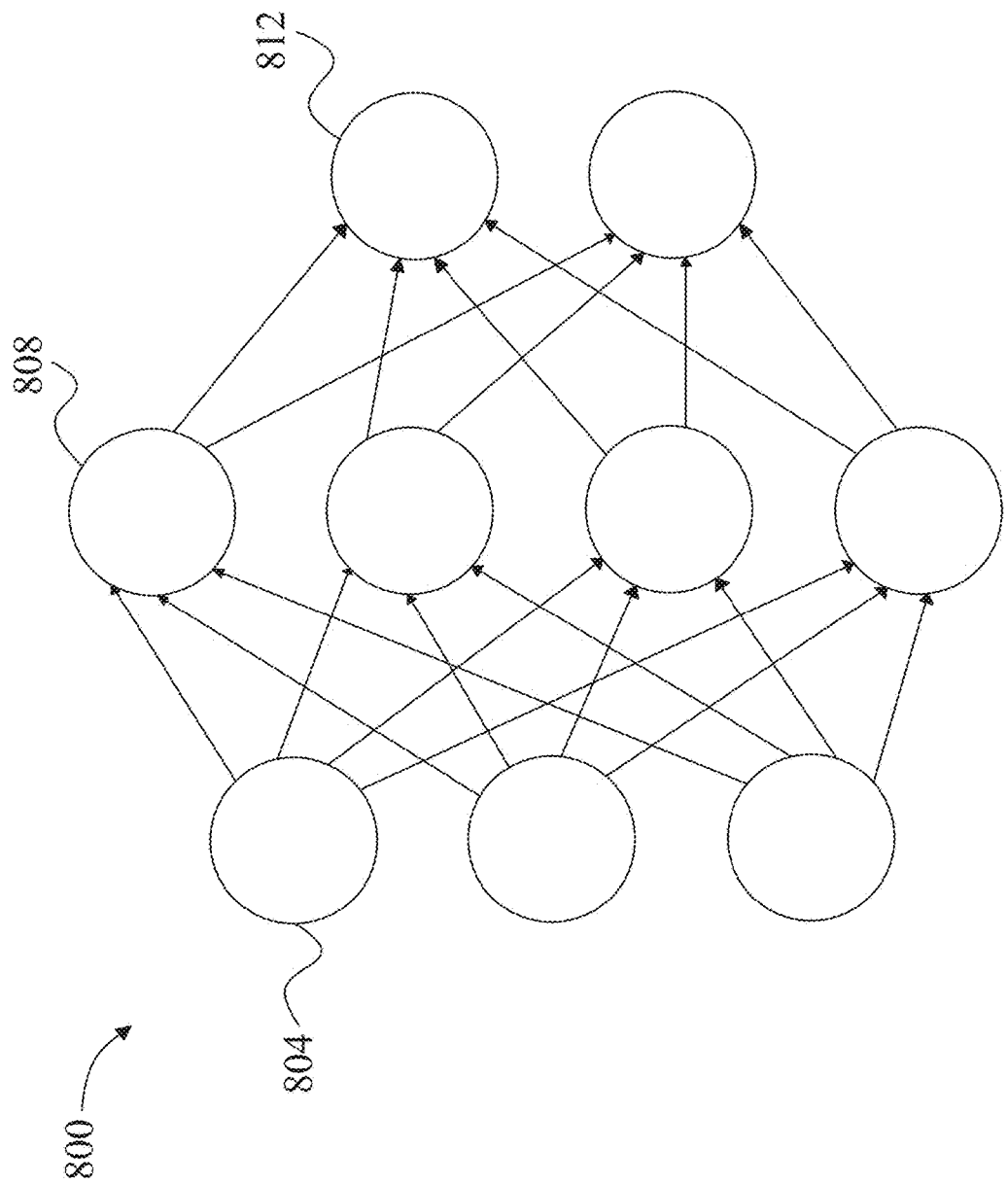
FIG. 8 illustrates a diagram of an exemplary neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
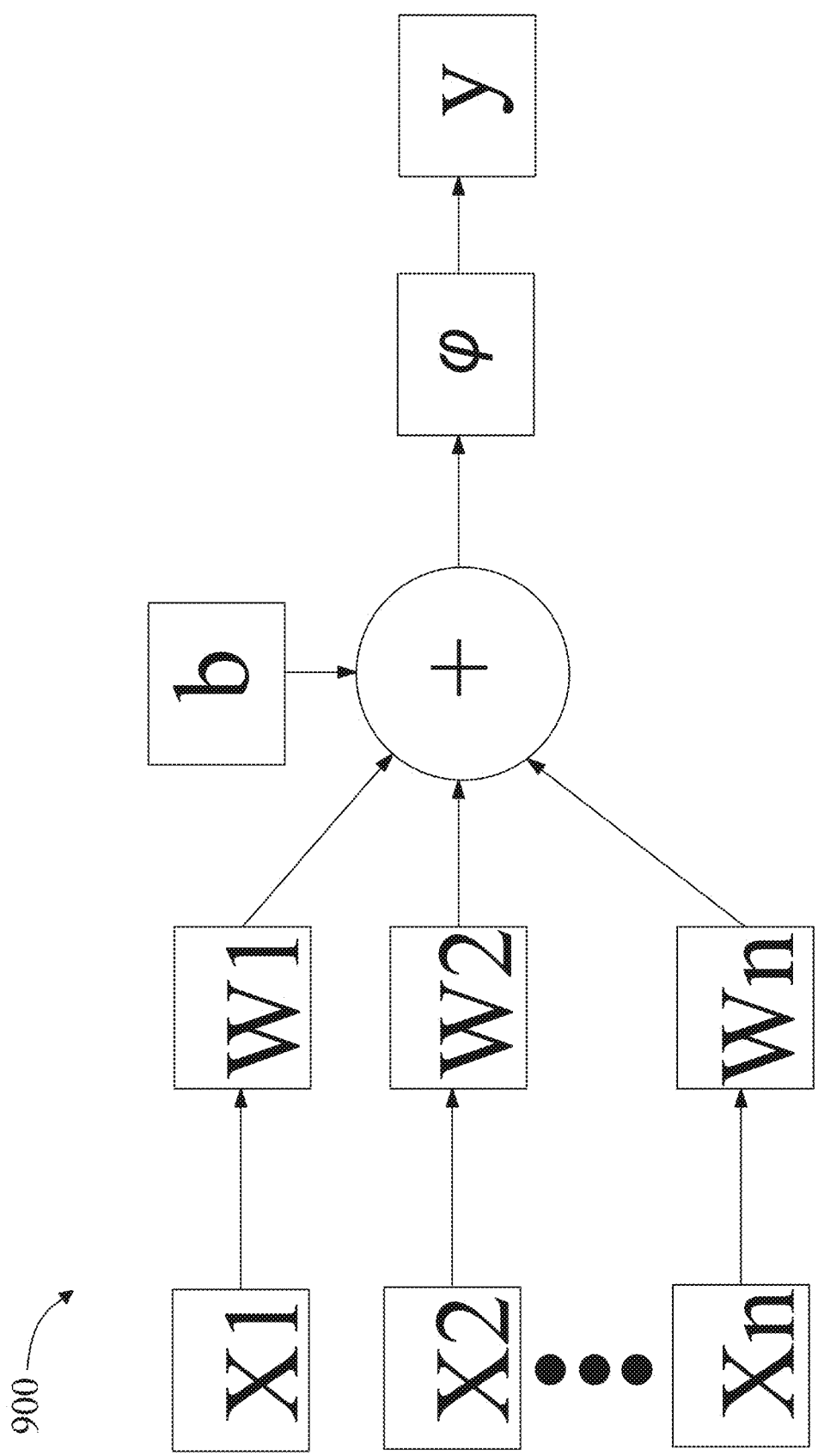
FIG. 9 illustrates a block diagram of an exemplary node in a neural network.

Referring now to FIG. 9, an exemplary embodiment of a node 900 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α this function may be replaced and/or weighted by its own derivative in some embodiments), a softmax function such as $$f(x_i) = \frac{e^x}{\sum_i x_i}$$

where the inputs to an instant layer are $x^i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 10:
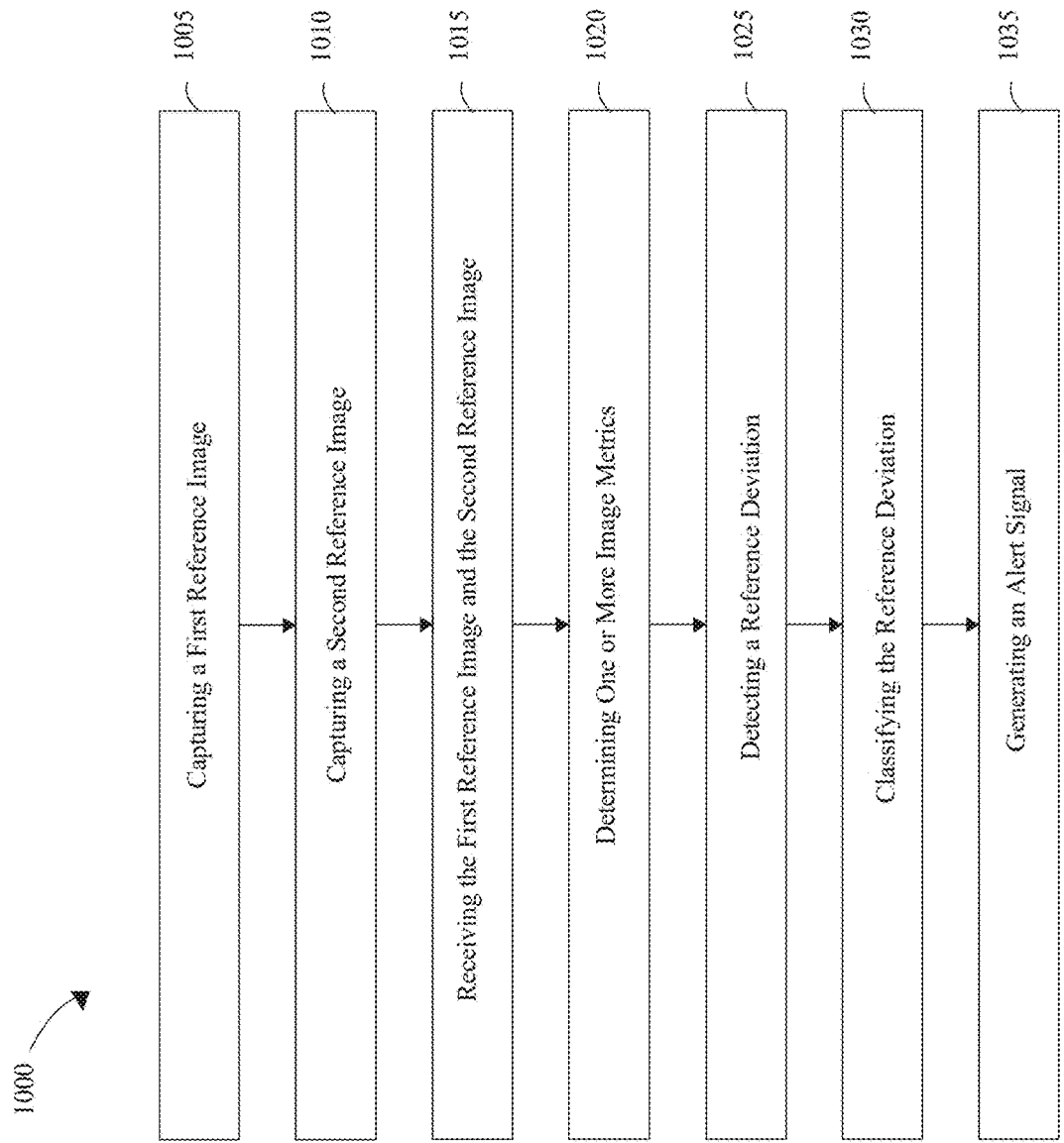
FIG. 10 illustrates a flow diagram of an exemplary method for automated calibration for a scanning system.

Referring now to FIG. 10, a flow diagram of an exemplary method 1000 for automated calibration for a scanning system. Method 1000 contains a step 1005 of capturing, using an optical sensor, a first reference image of an imaging reference prior to scanning a target, wherein the imaging reference is located on a scanning stage of a scanner. In some embodiments, the imaging reference may be embedded adjacent to a target position of the scanning stage. In some embodiments, the imaging reference may include a resolution target including line pairs, wherein the resolution target is configured for analyzing a resolution. These may be implemented as reference to FIGS. 1-9.

With continued reference to FIG. 10, method 1000 contains a step 1010 of capturing, using the optical sensor, a second reference image of an imaging reference after scanning a target. This may be implemented as reference to FIGS. 1-9.

With continued reference to FIG. 10, method 1000 contains a step 1015 of receiving, using at least a processor, a first reference image and a second reference image from an optical sensor. This may be implemented as reference to FIGS. 1-9.

With continued reference to FIG. 10, method 1000 contains a step 1020 of determining, using at least a processor, one or more image metrics of each of a first reference image and a second reference image as a function of reference features of imaging references in the first reference image and the second reference image. In some embodiments, the one or more image metrics may be associated with one or more of sharpness, resolution, and alignment. These may be implemented as reference to FIGS. 1-9.

With continued reference to FIG. 10, method 1000 contains a step 1025 of detecting, using at least a processor, a reference deviation in one or more image metrics between a first reference image and a second reference image. In some embodiments, detecting the reference deviation may include retrieving a metric baseline from a database; and comparing the one or more image metrics to the metric baseline. These may be implemented as reference to FIGS. 1-9.

With continued reference to FIG. 10, method 1000 contains a step 1030 of classifying, using at least a processor, a reference deviation to a deviation cause of the reference deviation. In some embodiments, classifying the reference deviation comprises classifying a focus inaccuracy of the reference deviation to an optical contamination of the deviation cause as a function of a degradation in sharpness metrics in the second reference image relative to the first reference image. In some embodiments, classifying the reference deviation may include classifying a geometric distortion of the reference deviation to a stage positioning error of the deviation cause as a function of a repetitive displacement of the reference features in the second reference image relative to the first reference image. In some embodiments, classifying the reference deviation may include classifying a resolution inconsistency of the reference deviation to a hardware malfunction of the deviation cause as a function of a degradation in visibility metrics of the reference features in the second reference image. These may be implemented as reference to FIGS. 1-9.

With continued reference to FIG. 10, method 1000 contains a step 1035 of and generating, using at least a processor, an alert signal as a function of a deviation cause. In some embodiments, generating the alert signal may include instructing a downstream algorithm to modify an interpretation of image data associated with the target, wherein the downstream algorithm may include an image processing module. In some embodiments, generating the alert signal may include generating the alert signal as a function of an optical contamination, wherein the alert signal may be configured to command a debris cleaning system to perform optical cleaning. In some embodiments, the automated calibration process may include micron per pixel (MPP) calibration. In some embodiments, method 1000 may further include registering, using the at least a processor, the imaging reference as an anti-tamper element for anti-tamper protection. These may be implemented as reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
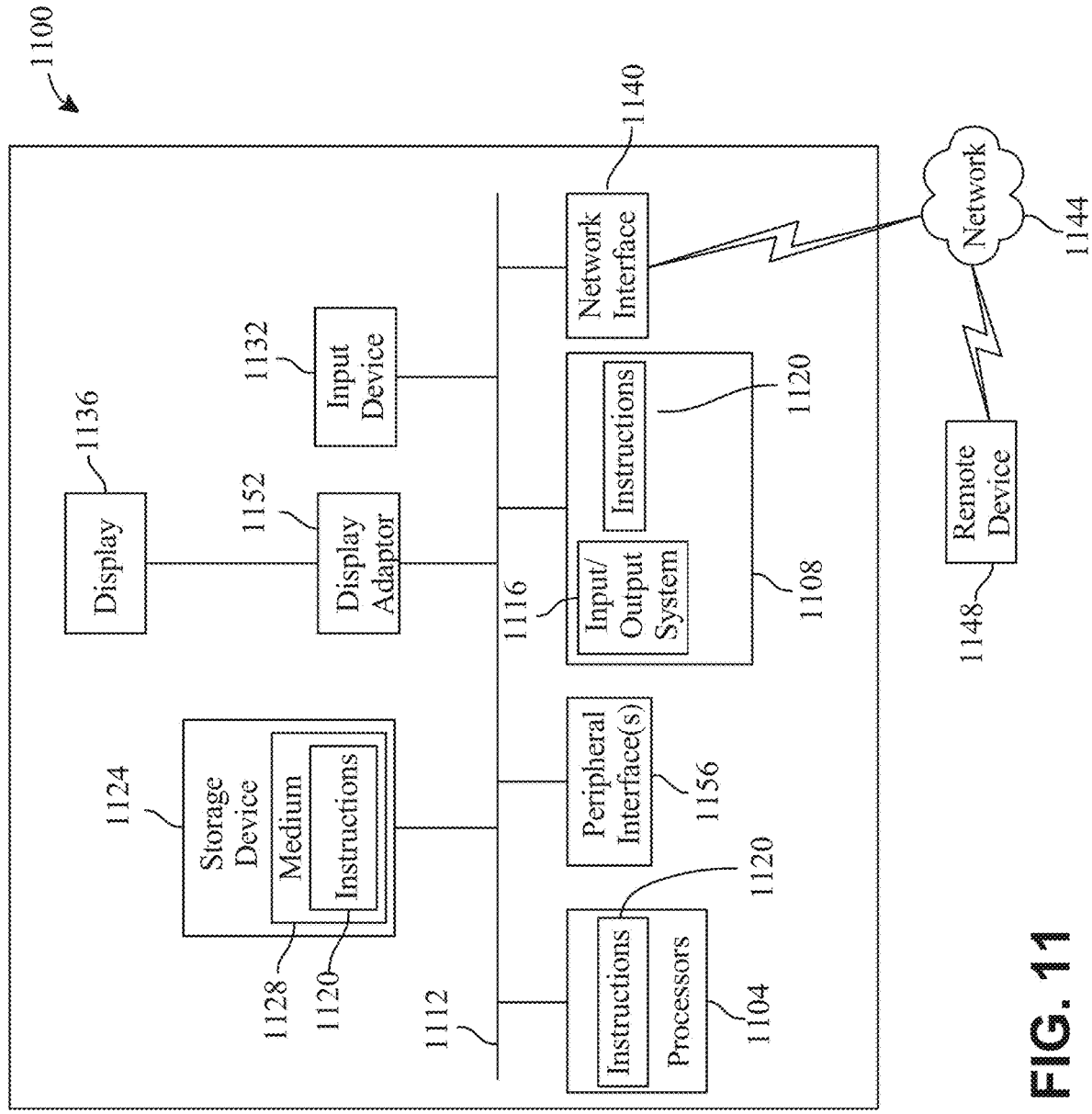
FIG. 11 illustrates a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and memory 1108 that communicate with each other, and with other components, via a bus 1112. Bus 1112 may include any of several types of bus structures including, but not limited to, memory bus, memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display 1136. Examples of a display device include, but are not limited to, a liquid crystal display (LCD), a cathode ray tube (CRT), a plasma display, a light emitting diode (LED) display, and any combinations thereof. Display adapter 1152 and display 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated calibration for a scanning system, the system comprising:
   an imaging reference located on a scanning stage of a scanner;
   an optical sensor, wherein the optical sensor is configured to:
      capture a first reference image of the imaging reference prior to scanning a target; and
      capture a second reference image of the imaging reference after scanning the target;
   at least a processor; and
   a memory communicatively connected to the at least a processor, wherein the memory contains instructions configuring the at least a processor to:

receive the first reference image and the second reference image from the optical sensor;

determine one or more image metrics of each of the first reference image and the second reference image as a function of reference features of the imaging references in the first reference image and the second reference image;

detect a reference deviation in the one or more image metrics between the first reference image and the second reference image;

classify the reference deviation to a deviation cause of the reference deviation; and generate an alert signal as a function of the deviation cause, wherein the alert signal is configured to initiate an automated calibration process.

2. The system of claim 1, wherein the imaging reference is embedded adjacent to a target position of the scanning stage.

3. The system of claim 1, wherein the imaging reference comprises a resolution target comprising line pairs, wherein the resolution target is configured for analyzing a resolution.

4. The system of claim 1, wherein the one or more image metrics are associated with one or more of sharpness, resolution, and alignment.

5. The system of claim 1, wherein detecting the reference deviation comprises:
retrieving a metric baseline from a database; and
comparing the one or more image metrics to the metric baseline.

6. The system of claim 1, wherein classifying the reference deviation comprises classifying a focus inaccuracy of the reference deviation to an optical contamination of the deviation cause as a function of a degradation in sharpness metrics in the second reference image relative to the first reference image.

7. The system of claim 6, wherein generating the alert signal comprises generating the alert signal as a function of the optical contamination, wherein the alert signal is configured to command a debris cleaning system to perform optical cleaning.

8. The system of claim 1, wherein classifying the reference deviation comprises classifying a geometric distortion of the reference deviation to a stage positioning error of the deviation cause as a function of a repetitive displacement of the reference features in the second reference image relative to the first reference image.

9. The system of claim 1, wherein classifying the reference deviation comprises classifying a resolution inconsistency of the reference deviation to a hardware malfunction of the deviation cause as a function of a degradation in visibility metrics of the reference features in the second reference image.

10. The system of claim 1, wherein the alert signal is configured to instruct a downstream algorithm to modify an interpretation of image data associated with the target, wherein the downstream algorithm comprises an image processing module.

11. The system of claim 1, wherein the automated calibration process comprises micron per pixel (MPP) calibration.

12. The system of claim 1, wherein the memory contains instructions further configuring the at least a processor to register the imaging reference as an anti-tamper element for anti-tamper protection.

13. A method for automated calibration for a scanning system, the method comprising:

capturing, using an optical sensor, a first reference image of an imaging reference prior to scanning a target, wherein the imaging reference is located on a scanning stage of a scanner;

capturing, using the optical sensor, a second reference image of the imaging reference after scanning the target;

receiving, using at least a processor, the first reference image and the second reference image from the optical sensor;

determining, using the at least a processor, one or more image metrics of each of the first reference image and the second reference image as a function of reference features of the imaging references in the first reference image and the second reference image;

detecting, using the at least a processor, a reference deviation in the one or more image metrics between the first reference image and the second reference image;

classifying, using the at least a processor, the reference deviation to a deviation cause of the reference deviation; and generating, using the at least a processor, an alert signal as a function of the deviation cause, wherein the alert signal is configured to initiate an automated calibration process.

14. The method of claim 13, wherein the imaging reference is embedded adjacent to a target position of the scanning stage.

15. The method of claim 13, wherein the imaging reference comprises a resolution target comprising line pairs, wherein the resolution target is configured for analyzing a resolution.

16. The method of claim 13, wherein the one or more image metrics are associated with one or more of sharpness, resolution, and alignment.

17. The method of claim 13, wherein detecting the reference deviation comprises:
retrieving a metric baseline from a database; and
comparing the one or more image metrics to the metric baseline.

18. The method of claim 13, wherein classifying the reference deviation comprises classifying a focus inaccuracy of the reference deviation to an optical contamination of the deviation cause as a function of a degradation in sharpness metrics in the second reference image relative to the first reference image.

19. The method of claim 18, wherein generating the alert signal comprises generating the alert signal as a function of the optical contamination, wherein the alert signal is configured to command a debris cleaning system to perform optical cleaning.

20. The method of claim 13, wherein classifying the reference deviation comprises classifying a geometric distortion of the reference deviation to a stage positioning error of the deviation cause as a function of a repetitive displacement of the reference features in the second reference image relative to the first reference image.

21. The method of claim 13, wherein classifying the reference deviation comprises classifying a resolution inconsistency of the reference deviation to a hardware malfunction of the deviation cause as a function of a degradation in visibility metrics of the reference features in the second reference image.

22. The method of claim 13, wherein generating the alert signal comprises instructing a downstream algorithm to modify an interpretation of image data associated with the target, wherein the downstream algorithm comprises an image processing module.

23. The method of claim 13, wherein the automated calibration process comprises micron per pixel (MPP) calibration.

24. The method of claim 13, further comprising:
registering, using the at least a processor, the imaging reference as an anti-tamper element for anti-tamper protection.

* * * * *